US012801768B2

(12) United States Patent

Kannan et al.

(10) Patent No.: US 12,801,768 B2

(45) Date of Patent: Nov. 17, 2026

(54) PROVIDING TEMPORARY GUEST ACCESS TO A MEDIA PLAYBACK SYSTEM

(71) Applicant: Sonos, Inc., Santa Barbara, CA (US)

(72) Inventors: Dinesh Kannan, Seattle, WA (US); Xue Bin, Seattle, WA (US); Elliot Lawrence, Renton, WA (US)

(73) Assignee: SONOS, INC., Goleta, CA (US)

( * ) Notice: Subject to any disclaimer, the term of this patent is extended or adjusted under 35 U.S.C. 154(b) by 240 days.

(21) Appl. No.: 18/452,909

(22) Filed: Aug. 21, 2023

(65) Prior Publication Data

US 2024/0078331 A1 Mar. 7, 2024

Related U.S. Application Data

(60) Provisional application No. 63/404,314, filed on Sep. 7, 2022.

(51) Int. Cl.

| | |
|---|---|
| ***G06F 21/62*** | (2013.01) |
| ***G06F 16/635*** | (2019.01) |
| ***G06F 16/638*** | (2019.01) |
| *G06F 16/60* | (2019.01) |

(52) U.S. Cl.

CPC ........ *G06F 21/6218* (2013.01); *G06F 16/639* (2019.01); *G06F 2221/2141* (2013.01)

(58) Field of Classification Search

None

See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |

(Continued)

FOREIGN PATENT DOCUMENTS

| | | | | |
|---|---|---|---|---|
| CN | 109905769 A * | 6/2019 | ............ | H04N 21/45 |
| EP | 1389853 A1 | 2/2004 | | |

(Continued)

OTHER PUBLICATIONS

A Survey of Recent Developments in Home M2M Networks. Chen et al. IEEE. (Year: 2014).*

(Continued)

*Primary Examiner* — Venkat Perungavoor

(74) *Attorney, Agent, or Firm* — Workman Nydegger

(57) ABSTRACT

Systems and methods for providing temporary guest access to a media playback system are disclosed. An example implementation involves a computing device configured to generate, after receiving a request from a control device, a guest account operative for a particular period of time. During the particular period of time, the guest account has access to at least one functionality in the media playback system. After the particular period of time and based on one or more messages received from the control device, the commuting device stores the set of data in association with the guest identifier. Based on receiving a request to generate a user account associated with the guest identifier, the computing device generates the user account using the set of data, wherein the user account is associated with the same user as the guest profile and dissociated from the host media playback system.

20 Claims, 11 Drawing Sheets

(56) References Cited

U.S. PATENT DOCUMENTS

| | | | | |
|---|---|---|---|---|
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,307,456 | B2 * | 11/2012 | Walsh | G06F 21/6218 726/28 |
| 8,483,853 | B1 | 7/2013 | Lambourne | |
| 8,942,252 | B2 | 1/2015 | Balassanian et al. | |
| 11,004,284 | B2 * | 5/2021 | Zilka | G07C 9/00571 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2014/0286199 | A1 * | 9/2014 | Li | H04M 15/64 370/259 |
| 2019/0310820 | A1 * | 10/2019 | Bates | G06F 9/44505 |
| 2020/0014552 | A1 * | 1/2020 | Tan | H04L 12/2809 |
| 2024/0184509 | A1 * | 6/2024 | Bates | G06F 3/16 |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

PROVIDING TEMPORARY GUEST ACCESS TO A MEDIA PLAYBACK SYSTEM

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
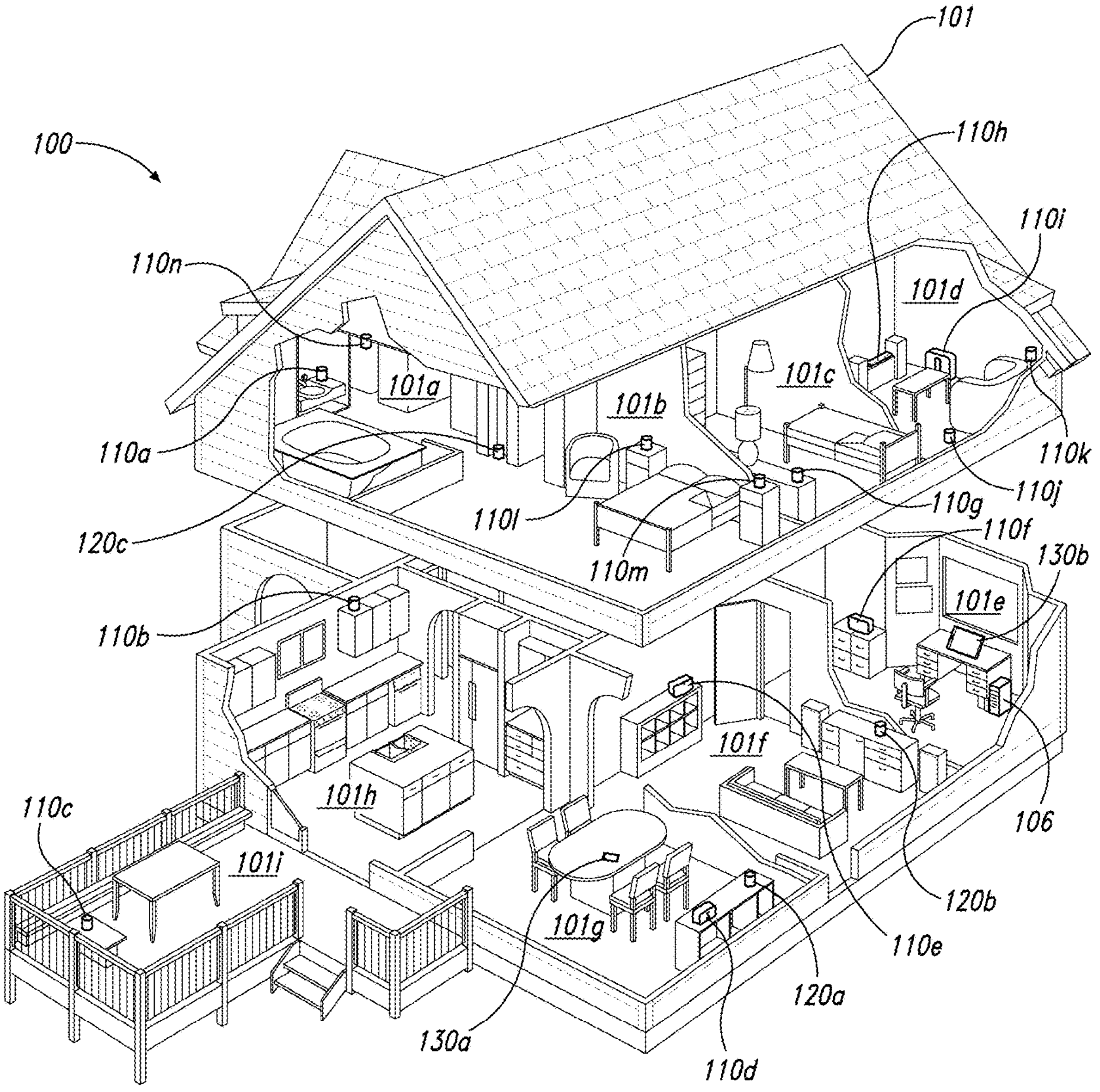
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to techniques for providing temporary guest access to a media playback system. The media playback system can be associated with a user or group of users (owners or hosts) that have access to and are authorized to control a set of functionalities for the media playback system. The media playback system can, in some instances, allow for interactions with additional users (e.g., guests), for example to allow such users to control one or more functionalities for the media playback system.

In some instances, the guests can interact with the media playback system on a temporary basis. The temporary interaction can be facilitated through the use of a temporary guest account with the media playback system in a manner that enables the guest to have control over the data they share with the host and the media playback system. The temporary guest account can be created on demand and with minimum user interaction. This temporary guest account can be operative for a particular period of time (e.g., while the guest is allowed to interact with the host media playback system). Data related to the temporary guest account can be stored by a computing device (for example a media playback system provider server). For example, the guest can register music service accounts to the temporary guest account and data associated with such music service accounts (e.g., an access token, a listening history, preferences, etc.) can be stored. This data can be advantageously used for different purposes in the future such as to streamline a future interaction of the guest user with the media playback system provider. For example, the data collected while the temporary account was operative and used to interact with a host media playback system can be used in the future to create an account for the guest (regardless of the host media playback system). The account for the guest may be a regular account with the media playback system provider when the guest becomes a user of the media playback system provider (e.g., an owner, subscriber, etc.).

As an example, an owner of a media playback system ("Host" in this example) could invite a friend ("Guest" in this example) over for dinner at the Host's house. During the dinner, it may be desirable that the Guest be allowed to access the Host's media playback system, for example, to play music from their own personal music library and to use the Guest's listening preferences to inform playback content. The Host may be concerned that the Guest may be able to access/use their data and accounts associated with the Host's media playback system. On the other hand, the Guest may be concerned about the data they share during this interaction (e.g., data related to the Guest's music service accounts) being accessed and/or used in the future by anyone who accesses the Host's media playback system. To minimize these concerns, a temporary guest account can be created for the Guest, for example, when the Guest attempts to communicate with the Host's media playback system. In this way, the Host can access the media playback system using the host account already associated with the system while the Guest can access the Host's media playback system using their own individual temporary guest account, and none of them has access to the other's account information and/or privileges.

The temporary guest account can be created automatically and with minimum to no interaction required from the Guest. Using this temporary guest account, both the I-lost and the Guest can share control of at least one functionality for the Host's media playback system. Examples of functionalities that the Host and the Guest can control include editing a playback queue, controlling volume, controlling grouping of playback devices, among others. For example, they can both add media items for playback from their own music service accounts. In some instances, the Host can restrict the functionalities that the Guest can control for the media playback system. For example, the Guest may be allowed to add or delete media items for playback by a playback device in the living room, but may not be allowed to increase or lower volume, or control any other playback device in the house other than the living room one. As another example, the Guest may be allowed to add media items for playback by a playback device in the living room, but may not be allowed to increase volume, delete media items from the queue, or control any other playback device in the house other than the living room one.

The temporary guest account can be active/operative and be used to interact with the Host media playback system for a particular period of time. For example, the temporary guest account can be active/operative while the Guest is within a proximity of the Host's media playback system, and/or for as long as the Host allows, among other possibilities. After the particular period of time (for example when the Guest leaves the Host's house), the temporary guest account can be deactivated so that it can no longer operatively interact with Host's media playback system.

In some instances, as or after the Guest leaves the I-lost's house, the Guest can be prompted to decide whether they want to store any data related to their interaction at the Host's house. If the Guest decides not to proceed, any data associated with the temporary guest account can be flagged to be permanently deleted. If, however, the Guest decides to store data associated with their previous interaction, such data can be stored. In some instances, the data is stored by a computing device which is independent from the Host's media playback system (e.g., a media playback system provider server). At this point, the Guest may provide additional data, such as an e-mail address or other user identifier to be stored in association with the data. In some instances, regardless of whether the Guest decides to store the data or not, no data associated with the Guests' temporary guest account is permanently stored by the Host's media playback system after the Guest leaves. In this way, the Guest can leave the Host's house without any concerns in this regard.

After some time (maybe because the Guest enjoyed the experience with the Host's media playback system) the Guest may decide to also become a user of the media playback system provider, for example to obtain their own media playback system (of at least one playback device), or subscribe to a service provided by the media playback system provider, such as a media streaming service. At this time, any data stored during the Guest's previous interactions (for example while using the temporary guest account at the Host's house) can be used to generate, populate, and/or pre-configure a proper account for the Guest. For example, data such as music service accounts, listening history, preferences and/or any other data mined from the previous interaction can now be pre-populated for the Guest. In this way, the Guest can enjoy a smooth onboarding experience. Additionally, in case of a future interaction of the Guest with the same or a different Host media playback system, the Guest could access their stored data to streamline their next guest experience based on the previous one.

Similarly, the media playback system could be at a commercial establishment, such as a hotel or store. When customers visit the establishment, it may be desirable that the customers be allowed to access the media playback system, for example to link their personal media streaming accounts to the media playback system. Customers can be allowed to access securely and temporarily by using a temporary guest account. Any data associated with the temporary guest account can then be stored to facilitate any future interaction with such customers.

Sharing access to a media playback system with guests can present various challenges, such as how to address security concerns from both the host and the guest perspectives. In some current implementations, guests who have been given access to a host network (e.g., host WiFi) are able to access all controls and settings of the host media playback system. In other words, the guest has the same privileges and access as the host or owner of the host media playback system. In those implementations, the host lacks a mechanism for controlling or limiting guest access and privileges. On the other hand, the guest lacks a mechanism to securely share account information such as music services accounts on a temporary basis while having control over how their data is used. Control over guest data can include preventing the guest data from being accessed and/or stored for future use by the host media playback system. Furthermore, current guest experiences miss opportunities to improve and streamline future interactions based on information previously provided. For example, current guest experiences lack a mechanism optimized for facilitating future interactions that leverage past guest interactions with host media playback systems.

The systems and methods for providing temporary guest access to a media playback system described herein aim to provide a secure mechanism for both hosts and guests to share control of at least one functionality of the host media playback system on a temporary basis, while at the same time leveraging the guest interaction with the host media playback system for future benefit of the guests themselves. The techniques involve the use of a temporary guest account for the guest to communicate with the host media playback system, so that the guest can enter personal data such as credentials for a media streaming service account securely and independently of any other account (e.g., a host account) being used to access the host media playback system.

The guest account can be a temporary account so that it is operative for a limited period of time. The limited period of time can be defined in multiple ways such as based on a preset access time and/or limited by proximity to the host media playback system, among other options. For example, the guest profile may only be operative or active for a period of time set by the host of the media playback system. In this way, the host can control when access to the media playback system is shared and with which users. As another example, the guest account may only be operative as long as the guest is within a proximity of a host network or host media playback system. The determination that the guest is within a proximity of a host network or host media playback system can be made based on a determination that the guest (or the guest control device) is within a communication range of a host network such as the host WiFi network, or within a communication range of the host media playback system via any available technology such as Bluetooth, NFC, etc., so that when the guest leaves such communication range, the guest account is deactivated and no longer operative. As another example, the determination that the guest is within a proximity of the host media system can be based on location specific data, such as GPS coordinates or other data. Examples of proximity-based control are disclosed in U.S. Pat. No. 10,055,108, filed Apr. 8, 2015, entitled "Location Based Playback System Control", which is incorporated by reference in its entirety. Providing a temporary guest account can be advantageous not only from the host perspective but also for the guest as the guest can securely access the host media playback system without permanently sharing any data (e.g., credentials, access tokens, etc.) with the host media playback system or sharing the data for an indefinite or undefined period of time.

Data related to the interactions of the guests with the host media playback system can be deleted or flagged for removal once the guests leave the host location to avoid security and privacy concerns. In some embodiments, the guest may voluntarily decide to store data associated with the guest profile for future use. In one instance, the data can be stored by a computing device and/or a storage device associated with the media playback system provider, but not by the host media playback system itself. In other words, the host media playback system will not have access to the guest profile after the guest leaves. In another instance, the guest may be a frequent guest user of the host media playback system, and the guest may opt to have the host media playback system retain the temporary profile, for example for a limited period of time. In cases in which the guest decided to store the data, such data could be used in the future for multiple purposes. One example includes creating an account with the media playback system provider when the guest decides to acquire a media playback system in the future.

In some embodiments providing temporary guest access to a media playback system in accordance with the systems and methods disclosed herein comprises storing a host account, where the host account is authorized to control a set of functionalities in a host media playback system that comprises one or more playback devices. A request can be received, from a control device, to communicate with at least one playback device in the host media playback system. Based on determining that the control device is not associated with the host account, a guest account can be generated, where the guest account is operative for a particular period of time, and during the particular period of time, both the host account and the guest account share control of at least one functionality in the set of functionalities. A set of data associated with the guest account, an indication to store the set of data and a guest identifier can be received from the control device in one or more messages. After the particular period of time and based on the received one or more messages, the set of data can be stored in association with the guest identifier. Based on receiving a request to generate a user account associated with the guest identifier, the user account can be generated using the set of data, where the user account is associated with the same user as the guest account and dissociated from the host media playback system.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house or other location). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e* a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable. The playback devices in media playback system 100 can be associated with a system identifier, which indicates that each of the playback devices is part of the media playback system 100. Additional details regarding system identifiers can be found, for example, in U.S. Pat. No. 10,602,286, filed Jun. 25, 2018, entitled, "Controlling Multi-Site Media Playback Systems" which is incorporated herein by reference in its entirety.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
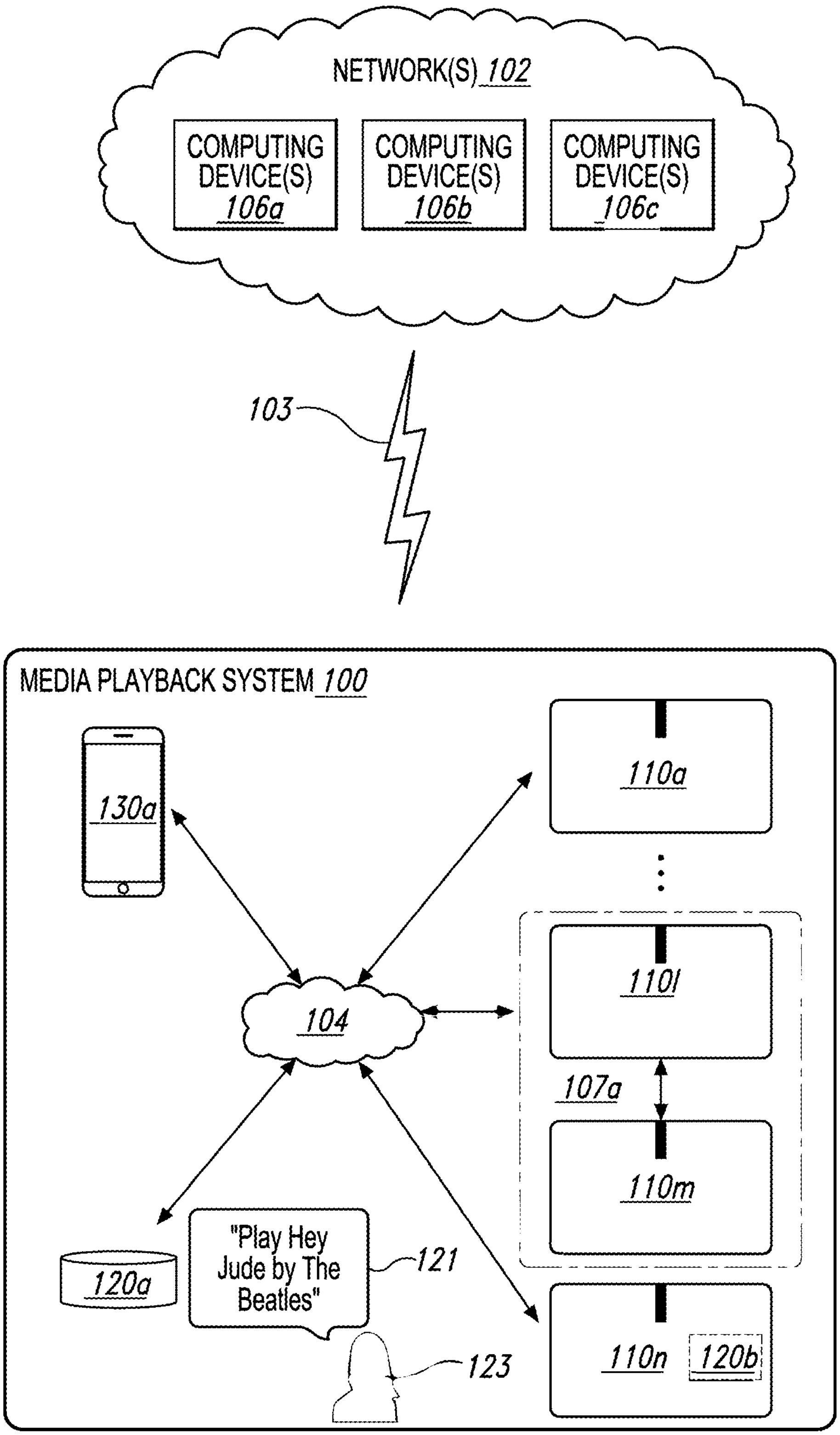
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data or other data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices **110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110**.

The media playback system 100 includes the NMDs **120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100**.

In some aspects, for example, the computing device **106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103**.

In response to receiving the voice input data, the computing device **106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100** in accordance with the user's voice utterance.

b. Suitable Playback Devices

Figure 1C:
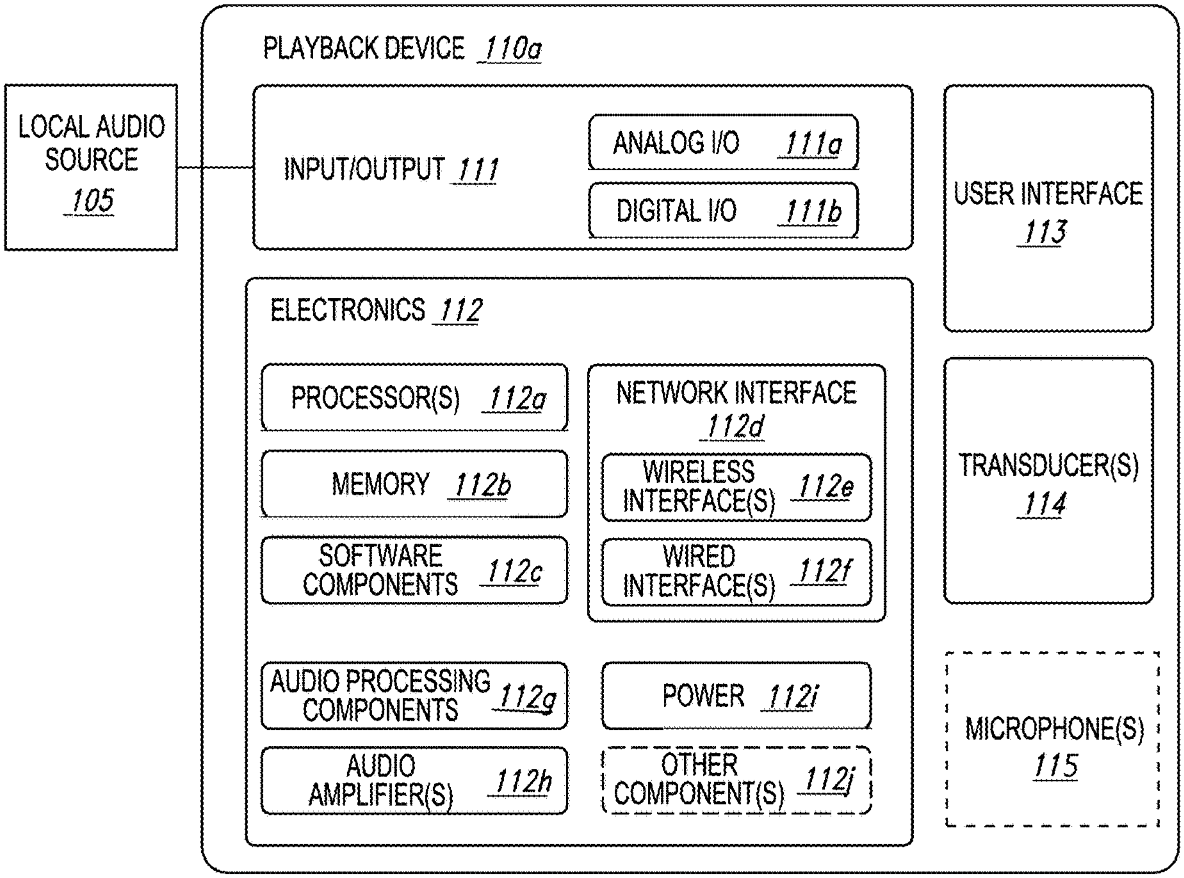
FIG. 1C is a block diagram of a playback device.

FIG. 1C is a block diagram of the playback device **110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111***a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 113) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
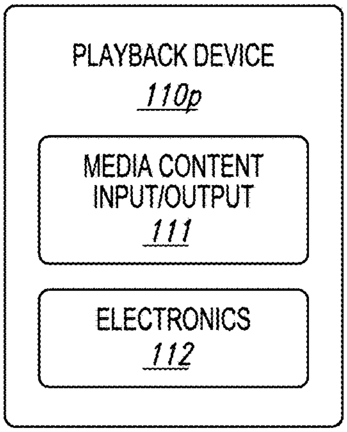
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
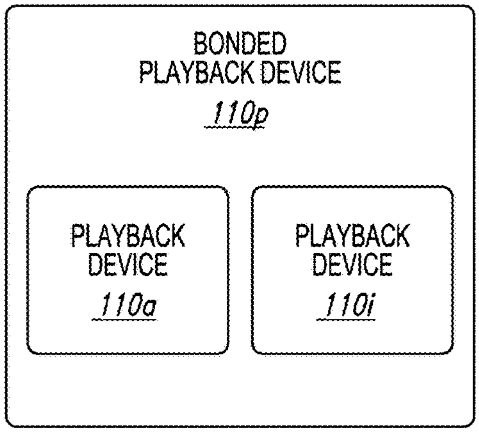
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

Figure 1F:
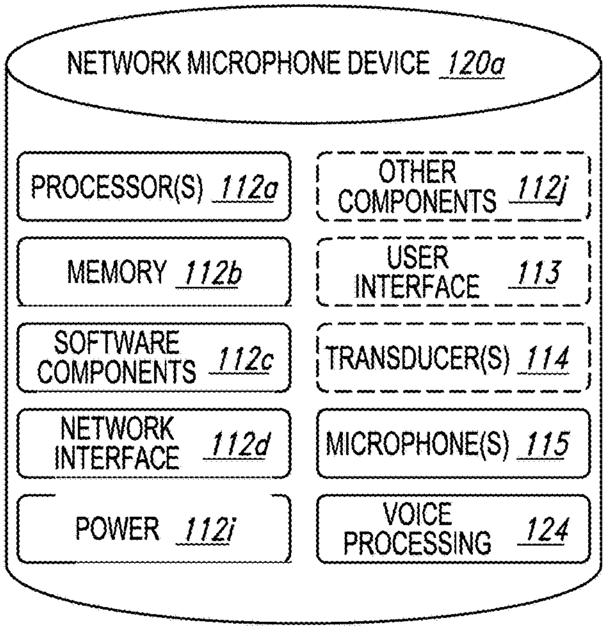
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
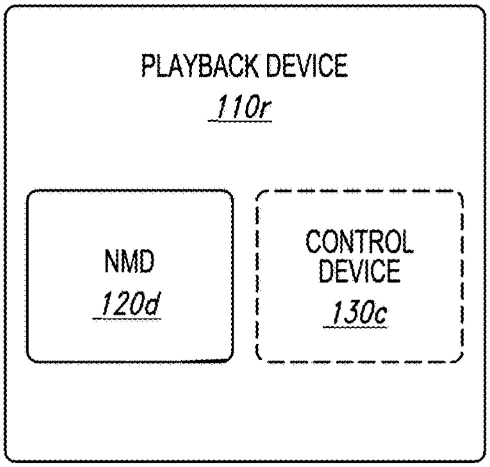
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Sir" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
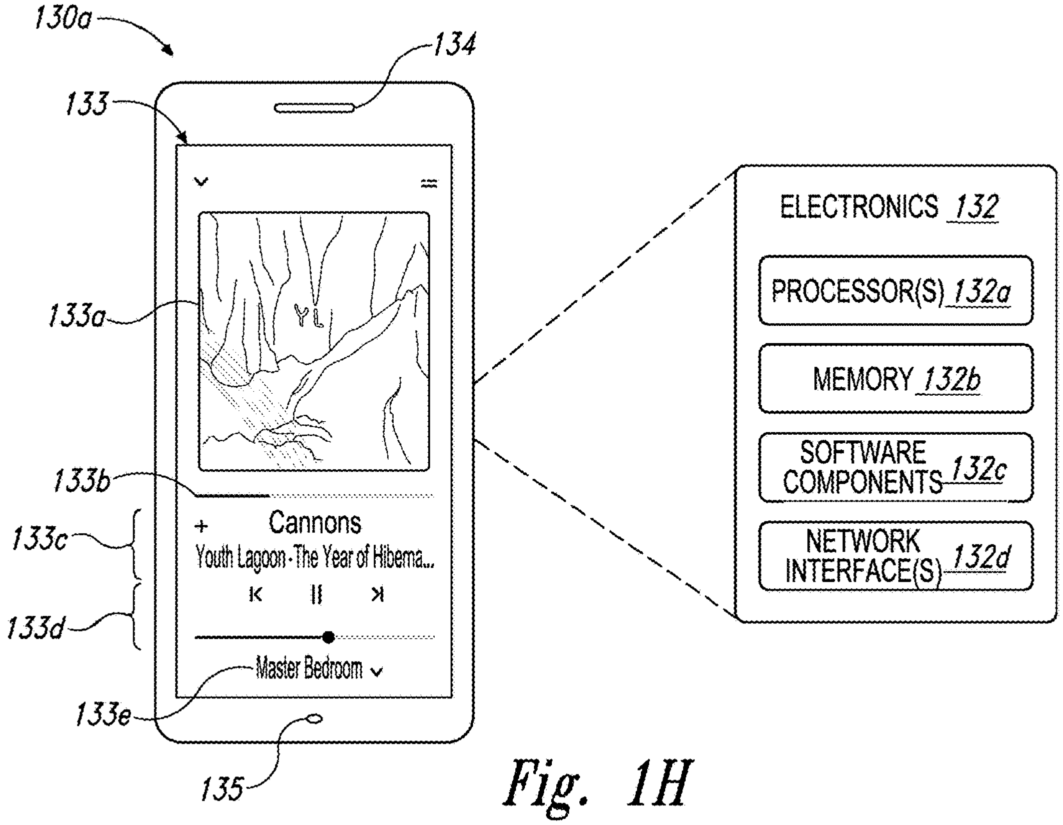
FIG. 1H is a partial schematic diagram of a control device.

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™ an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Methods for Providing Temporary Guest Access to a Media Playback System Referring back to FIG. 1A, the media playback system 100 can be associated with a user or family of users (referred herein as media playback system owners or hosts). In some embodiments, a user (owner/host) identifier can be used to identify the user or family of users that is associated with the media playback system (e.g., users that can access the media playback system). For example, the user identifier can relate to the name of a user or can be a string of alphanumeric or other characters, or to any other identifier such as an e-mail address. Alternatively or in combination, the user identifier can relate to a user (host/owner) account with permission to perform certain functions, such as configuring and/or adding additional media playback devices and/or services to the media playback system. In other words, the host account can be authorized to control a set of functionalities in the host media playback system. Additional details regarding user identifiers can be found, for example, in U.S. Pat. No. 10,602,286, filed Jun. 25, 2018, entitled, "Controlling Multi-Site Media Playback Systems" which was incorporated by reference above.

In some embodiments, the user account can be associated with a user profile for the account linked to the particular user or family of users. Each user in the family may have an individual user profile associated with the user account. The account/profile can be an account/profile with the media playback system provider (e.g., a Sonos user account), which can be created as part of a setup process for the media playback system. Additional details regarding the setup process can be found, for example, in U.S. Patent Pub. No. 2022/0104015, filed Sep. 24, 2021, entitled, "Intelligent Setup for Playback Devices" which is incorporated herein by reference in its entirety. The account can be associated with a media playback system identifier, which may be used as a basis to uniquely register the playback devices in the media playback system as belonging to the user (owner or host), and to the user's media playback system (also referred herein as owner's/host's media playback system).

In some embodiments and still with reference to FIG. 1A, control devices such as control devices 130 can be host control devices which are associated with the host account so that the host can control the media playback system 100 using the host control device. For example, the host control device may have been authorized via an authentication token to control the host media playback system. The authentication token may be stored in association with the host account. Examples of how the host control device can be authenticated to control the host media playback system are disclosed in U.S. patent application Ser. No. 17/662,530, filed May 9, 2022, entitled "Authorization Management in a Media Playback System" which is incorporated by reference herein in its entirety.

In some instances, the authentication token can be generated/obtained by a device (e.g., a computing system, computing device, control device, and/or playback device)

in the media playback system. The token can be generated when the media playback system is initialized and/or refreshed after a certain period of time. The token can be associated with the user account used to generate/obtain the token so that any device associated (e.g., registered) with such account can obtain/use the token. The token can be replicated among and stored in one or more of the devices in the system (e.g., the playback devices). In some instances, a control device associated with the user account (e.g., one for which a user has entered credentials or otherwise logged in to the user's account) can obtain system state information from the devices in the system (for example when a controller application running on the control device is launched). The control device can receive the token from such devices and then associate (e.g., include) the token with any command/communication for the media playback system. In this way, the media playback system can verify that the control device communicating with it is authorized to do so.

As described previously in this disclosure, in some instances it may be desirable to allow a guest user (which is different than the owner/owners of the media playback system 100, such as a host's friend invited to a party at the host's house) to control at least one functionality in the host media playback system (e.g., the guest can add media items for playback by the media playback system 100). The guest can be allowed to communicate with the host media playback system using a guest personal device (e.g., guest's smartphone). In such embodiments, the guest's personal device can behave as a control device for the media playback system 100. In the examples used in this disclosure, control device 130*a* will be used to refer to a guest control device and control device 130*b* will be used to refer to a host control device. More than one guest and host control devices can be involved in any of the processes described herein.

In some embodiments, the guest control device might not be associated with the host profile nor the host media playback system. Because the guest control device is not associated with the host profile, it might not be authorized to communicate, control and/or interact with the host media playback system. A mechanism for temporary association of the guest control device to the host profile and/or host media playback system is therefore needed. Systems and methods for providing or controlling temporary guest access to the host media playback system will be described below with reference to FIGS. 2-5D.

Figure 2:
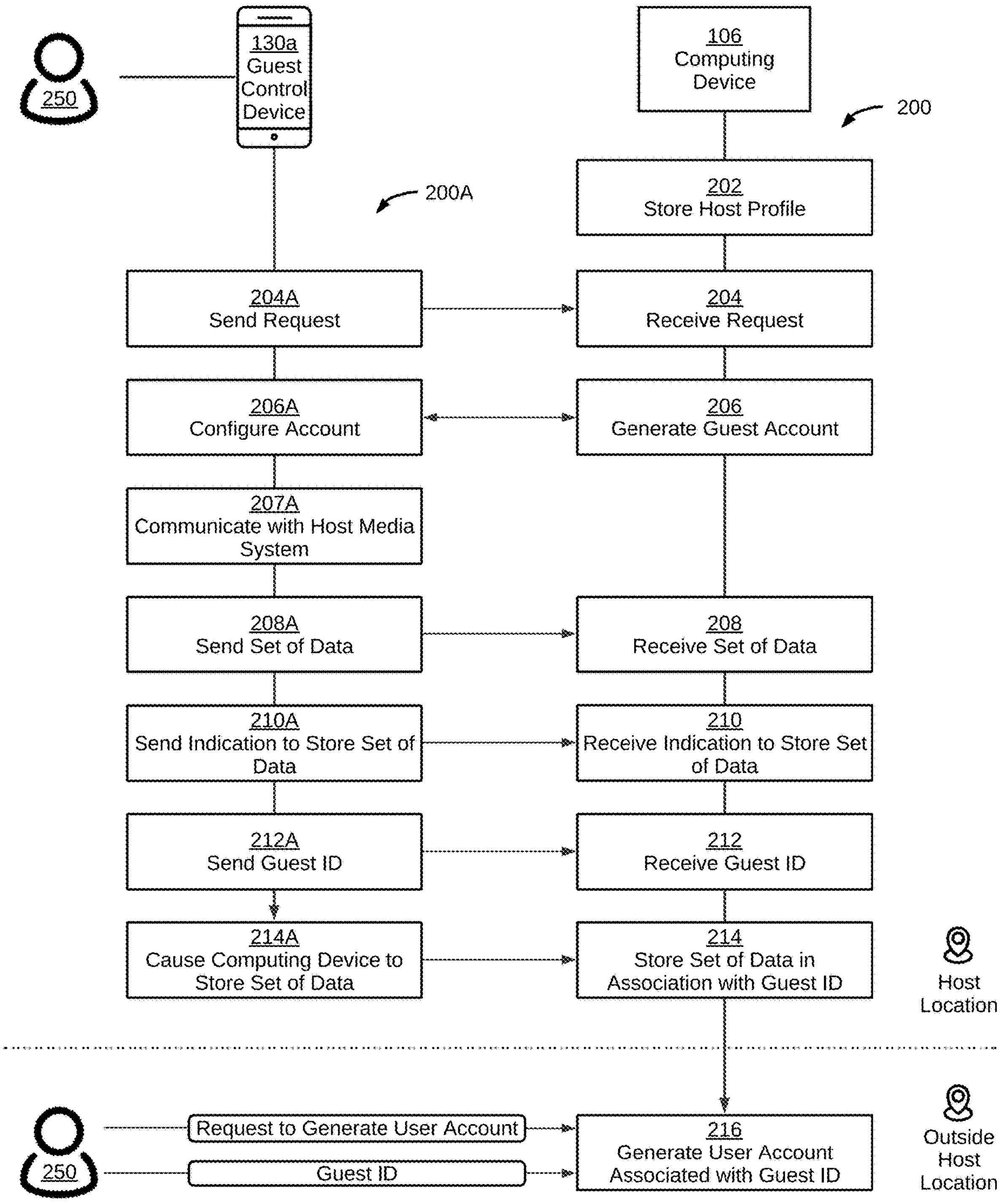
FIG. 2 illustrates a set of flow diagrams of example methods of operation for a computing device and a control device in accordance with embodiments described herein.

FIG. 2 illustrates an example set of flow diagrams of example methods of operation (200 and 200A) for a computing device, such as the computing devices 106 of FIG. 1A, and a control device, such as the control devices 130 of FIG. 1A, respectively. In the specific example illustrated in FIG. 2, control device 130*a* is a guest control device, which belongs to a guest 250 and is different than a control device of an owner(s) of the media playback system 100 (host). The computing device 106 can be a computing device associated with the media playback system provider, such as a media playback system control server.

Method 200 can start with block 202 of computing device 106 storing a host account (e.g., data corresponding to the host account). The host account can be stored as part of a setup process for media playback system 100, for example, when the host creates an account (such as a Sonos account) associated with one or more playback devices. Therefore, block 202 can occur at a completely different moment in time than the rest of the blocks in methods 200 and 200A. The computing system 106 can store a plurality of accounts associated with a plurality of media playback systems. For example, the computing device 106 can include a media playback system provider's server working in association with one or more databases to store the accounts of every user that registers with the system's provider. The computing device 106 can store an association between user's accounts and media playback systems associated thereto, so that when a device attempts to communicate with a given media playback system, the computing device can determine whether the device is associated with the media playback system/user account. For example, the computing device can determine whether the device attempting to communicate with the given media playback system is associated with the media playback system identifier and/or user identifier.

Block 202 can be performed during a setup process such as the setup process described in U.S. Patent Pub. No. 2022/0104015 which was incorporated by reference above, and/or during registration of at least one playback device of the media playback system. An example registration process is described in U.S. Pat. No. 10,602,286, which was incorporated by reference above. Other examples of how playback devices and/or media playback system can be pre-provisioned and/or configured for first use are disclosed in U.S. Pat. No. 9,319,409, filed Feb. 14, 2013, entitled "Automatic Configuration of Household Playback Devices", U.S. Pat. No. 9,237,384, filed Feb. 14, 2013, entitled "Automatic Configuration of Household Playback Devices", and U.S. Pat. No. 10,303,422, filed Jan. 5, 2016, entitled "Multiple-Device Setup", all of which are incorporated by reference herein in their entirety.

Method 200 includes a block 204 of the computing device 106 receiving a request to communicate with at least one playback device in the host media playback system. The request can be sent by the guest control device 130*a*, as indicated by block 204A in method 200A.

In some embodiments, the guest control device can send such requests automatically. For example, the request can be sent automatically when the guest control device enters the host network (e.g., network 104 in FIG. 1B), or upon attempting to communicate with the at least one playback device in the host media playback system. For example, the guest can access a control interface via the guest control device, such as a web control interface or a software application, that displays playback devices available for control. The request could be sent once the guest attempts to control one of the devices, for example if the user tried to start playback in one of the devices via the interface.

In other embodiments, the request can be sent in response to a user input, such as an input via the control interface that indicates that the guest wishes to control the at least one playback device. The guest may be prompted to indicate if they want to communicate with the at least one playback device, and the request can be sent upon acceptance of such prompt. The guest may be prompted to indicate if they want to communicate with the at least one playback device when they access the host network (e.g., network 104), and/or when they access a control interface of the media playback system such as a web control interface, a software application, or other control interface.

In other embodiments, the host can control access to the host media playback system so that guests cannot access the media playback system even if they are in the host network. In those embodiments, the host can share access with guests at the host discretion. For example, the host can send an invite to the guest for the guest to communicate with the host media playback system. The request can be sent once the guest accesses the invite or at another time, for example, at a time set by the host. These embodiments will be described in more detail below with reference to FIG. 4.

The request can be in the form of one or more messages sent from the control device to the computing device including, for example, via link 103 described with reference to FIG. 1B. The one or more messages can optionally include additional data. For example, the one or more messages can include data identifying the controller device sending the request, such as a device identifier, a user identifier, etc. As another example, the one or more messages can include data identifying the playback device/media playback system that the guest control device wants to communicate with, such as a media playback system identifier, a host identifier, a network and/or location identifier, etc. In some embodiments, the request can be accompanied by one or more messages from devices different than the device which sent the request. For example, the request from the guest control device could be received by the computing device together with (or substantially together with, of before/after) one or more messages from the host media playback system (for example from a host controller or a host playback device). The one or more messages from the host media playback system can include data identifying the system and/or other data such as authorization for the guest control device to access the host media playback system (for example to communicate with at least one host playback device and/or control at least one functionality for the at least one host playback device). In some instances, the one or more messages from the host control system can be received in response to a request from the computing device. For example, the computing device could send a request to the host media playback system to confirm whether access should be granted to the guest playback device. In some embodiments, the host can be prompted, for example via a user interface in the host control device, to grant or deny access. The computing device could use the host input to in turn grant or deny access to the guest control device. In some embodiments, the request can be sent by the host media playback system itself.

Method 200 includes a block 206 of the computing device generating a guest account. In some instances, block 206 can be conducted based on a determination that the device which sent the request in block 204 (the guest control device 130*a*) is not associated with the host profile of a host of the media playback system that the guest is trying to communicate with. The determination that the controller device which sent the request is not associated with the host profile can be made in various ways. For example, the computing device could compare a guest user identifier and/or guest control device identifier (which could have been included in the request, as explained before, or otherwise be accessible to the computing device) with a stored list of user/device identifiers (which could have been stored for example as part of block 202) and determine that there is no match for such guest user identifier and/or guest control device identifier. As another example, the computing device could determine that the guest user identifier and/or guest device identifier are not associated with the media playback system identifier received with the request. As another example, devices associated with the host profile could use an authentication token to communicate with the media playback system (as described, for example, in U.S. patent application Ser. No. 17/662,530 incorporated by reference above), so that the computing device can determine that the guest control device is not authorized to communicate with the host media playback system because there is no authentication token associated with the request.

In some embodiments, requests for access can be sent to the computing system only in instances in which the device is not already associated with the system, otherwise the device would be able to communicate with the host media playback system (either directly or through intermediate computing devices). In other words, requests for access in blocks 204A/204 can be sent to the computing device if is determined beforehand that the guest control device is not associated with the host media playback system. For example, the guest control device and/or host media playback system themselves can make this determination (for example based on data stored locally on the host media playback system, such as the host account itself and/or authentication token in the host control device). In those embodiments, the determination that the guest control device is not associated with the host profile is intrinsic to the request and therefore can be made automatically as the computing system received the request in block 204.

The guest account generated in block 206 can be temporary so that the guest is allowed to communicate with the host media playback system for a particular period of time. For example, the guest account can be operative for a particular period of time so that the guest controller device is prevented from communicating with the host playback devices before the particular period of time starts and after the particular period of time ends. During the particular period of time, both the host account and the guest account can share control of at least one functionality for the host media playback system, for example add media items for playback by the host media playback system, control volume, skip media items, etc. For example, the host media system may be configured to play back audio content from a queue of media items and the at least one functionality can comprise adding items to the queue of media items.

In order to provide temporary access for the guest, the host media playback system can be notified/updated so that the temporary account is flagged for access. As another example, the computing device could recognize (e.g., flag, map, etc.) the temporary account as authorized to access a given host media playback system, and access can be granted through the computing device. Temporary access can be granted via tokens as will be described in more detail in this disclosure. For example, the computing device and/or host media playback system could generate or otherwise provide a temporary access token for the guest control device to communicate with the host media playback system. The token could be generated/obtained as part of execution of block 206 of generating the guest account or before, such as when the host invited the guest to join their system, as will be described below in more detail.

In some embodiments, the particular period of time can be defined by at least one condition. In some instances, the particular period of time can start when a first condition is met and end when a second condition is met. For example, the first condition can include a pre-set start time for the particular period of time, and the second condition can include a pre-set end time for the particular period of time. The conditions, particular period of time, and/or the preset start and end times can be set by the computing device. For example, the start time can be the time at which the temporary guest profile is created, and the end time can be a time relative to the start time (e.g., 4 hours after). Alternatively or in combination, the conditions, the particular period of time, and/or the preset start and end times can be set by the host and/or the host media playback system. For example, the host user, via a host control device, can set the conditions and/or configure the period of time and/or start/end times.

As another example, the particular period of time can be defined by the existence of a network connection between the guest control device and the host media playback system, so that the period of time starts when the guest control device enters the host network (e.g., guest is connected to the host WiFi) and ends when the connection is interrupted (e.g., guest leaves host WiFi). In some embodiments, the particular period of time can be defined by the existence of an authorized connection between the host media playback system and the guest control device in addition to or alternative to any network connection. For example, even if the guest control device is in the host network (e.g., host WiFi) an additional connection can be established between the two so that the guest can communicate with the host media playback system. For example, a token authorized connection can be established between the guest control device and the host media playback system so that the period of time is defined by, and starts when, such token authorized connection is established, and ends when such token authorized connection ends (e.g., when the token expires). Examples of access control techniques using tokens are provided in U.S. Pat. No. 11,184,666, filed Apr. 1, 2019, entitled "Access Control Techniques for Media Playback Systems", which is incorporated herein by reference in its entirety.

In some embodiments, generating the guest account in step 206 includes assigning a guest identifier for the guest. In some instances, the guest can explicitly provide a guest identifier (e.g., a name, an email address, a phone number, or any other kind of identifier), and such guest identifier can be used in association with the account. For example, the guest may access a control interface (e.g., via a web portal or a software application) when attempting to communicate with the host media playback system and/or sending the request in step 204A. In this case, the guest could provide a guest identifier to be added to or otherwise associated with the request for access. The guest could be prompted to provide such guest identifier. The computing device could cause the user interface in the guest control device to display the prompt for the user to enter the guest identifier. The guest identifier can be sent from the guest control device and received by the computing device as part of the one or more messages exchanged in blocks 204A/204 and or as an independent message or set of messages.

In some embodiments, the guest is not required to provide any identifier when attempting to communicate with the host media playback system. In these embodiments, the computing device could use a system generated temporary identifier to be used in association with the temporary guest account. As with the host account, the guest account and guest identifier can be associated with a guest profile, which in this case could be a temporary profile that is operative only during the particular period of time.

Once the guest account is generated, the guest can optionally configure such account, as indicated in block 206A. The guest account can be configured, for example, via a control interface in the guest control device, which can be accessed via a web portal, a software application, or other means. Configuring the guest account can include associating one or more media streaming services with the guest account. For example, the guest may be able to associate one or more media streaming services with which the guest is registered, so that the guest can select media items using their own media streaming services accounts for playback by the host media playback system, without needing to use the host media streaming service accounts. Configuring the guest account could include alternatively or in combination populating the guest account with other data such as personal data (user name, date of birth, e-mail address, phone number, a picture, and the like), preferences, etc.

Once the guest account is generated as described with respect to block 206 and optionally configured as described in block 206A, the guest is then able to communicate with the host media playback system, as indicated by block 207A. At this time, the guest control device can control at least one functionality of the host media playback system. Functionalities of a media playback system include any operation and/or action that can be performed by the (or using the) media playback system. For example, the functionalities can include operations to modify a playback queue, such as adding/removing media items for playback by the media playback system. The functionalities can include any playback action such as play or pause, volume control, fast forward, rewind, skip to next, skip to previous, enter/exit shuffle mode, enter/exit repeat mode, enter/exit cross fade mode, etc. The functionalities can include configuration operations such as grouping one or more playback devices, naming one or more playback devices or group of playback devices, adding/removing accounts, preferences, customizations, music service accounts, etc. The functionalities can include changing settings such as volume limits, equalization settings, network communication settings, etc. The functionalities can include enabling/disabling features, such as enabling/disabling a voice assistant, enabling/disabling a power saving mode, enabling/disabling modes of operation (e.g., Bluetooth or others), etc. Other functionalities are possible and can vary depending on the type of media playback system.

In some embodiments, the guest control device is allowed to control all available functionality for the host media playback system (i.e., the guest control device can have the same level of privileges and/or control the host media playback system in the same way as the host control device). In other embodiments, the guest control device is allowed to control a limited set of functionalities for the host media playback system. For example, the guest control device may only be granted access to communicate with a limited number of playback devices in the host media playback system (for example only with the playback device for which access was requested in block 204A). Similarly, the guest control device may only be granted access to control certain features in the host media playback system (for example the guest control device may be granted access to add media items to a queue for playback by the host media playback system, but not to remove media items from the queue). Any combination of the above is also possible.

The level of privileges that a guest is granted can depend on numerous factors. For example, a set of guest privileges (or functionalities that the guest is allowed to control/not allowed to control) can be stored in memory accessible to the computing device and/or the host media playback system so that, if the guest attempts to perform an action that is not allowed the system can respond accordingly (e.g., ignoring the command for the action, prompting the guest user with a message informing that the action is not permitted, etc.). In some instances, selectable buttons or options associated with disabled functionality may be rendered inactive such that selection of the buttons by the user fails to generate any commands. The set of guest privileges can be a default set of guest privileges. For example, the host media playback system can be configured by a party (e.g., a manufacturer, provider, etc.) or by default to block certain functionalities for guests. For example, a guest control device could, by default, not be allowed to change any configuration of the host media playback system, such as grouping/ungrouping playback devices, creating zones, changing the names of the playback devices or rooms associated with them, etc.

In addition to or instead of a factory or default configuration of guest privileges, the guest privileges could be defined by the host. For example, a host may be able to define which functionalities and/or parts of the system guests can control. These privileges could be stored in memory accessible to the computing device and/or host media playback system so that, if the guest attempts to perform an action beyond the functionality enabled by the guest privilege level, the system can respond accordingly. The set of privileges defined by the host can be standard for all guests (e.g., permanent set of privileges stored in memory) or customized on a per-guest basis, as will be described in more detail with reference to FIG. 4. In any case, the guest will be able to communicate with the host media playback system (block 207A) during the particular period of time that the guest profile is operative while being limited to their level of privileges.

In some embodiments, during the particular period of time and specifically while the guest is able to communicate with the host media playback system as indicated in block 207A, the guest does not have access to the host account (or any other account being used to access the host media playback system) and vice versa. Examples of other forms of providing private control for multiple users are disclosed in U.S. Pat. No. 9,501,533, filed Apr. 16, 2013, entitled "Private Queue for a Media Playback System", and U.S. Pat. No. 9,953,179, filed May 29, 2013, entitled "Private Queue Indicator" which are incorporated by reference herein in their entirety. However, the guest and host are able to share control of at least one functionality of the media playback system. A shared instance of such functionality can be created by the host media playback system so that commands from the different active accounts communicating with the system can be individually received and processed but collectively executed. For example, a shared playlist could be created for the host media playback system so that all users contribute to it from their individual accounts although they do not have access to each other's accounts. In such example, each user could be able to access, through their own profile, their own media streaming services, select media items for playback, and instruct the host media playback system to add such media item to the shared playlist.

In some embodiments, an access token may be needed to access the different audio sources such as different media streaming services. Each user may own their own access token to the same or different media streaming services (for example the host and the guest can be users of a same or different media streaming services). In such cases, each user may be able to embed their own media streaming service access token in their request so that, even while contributing to a shared playlist, the host media playback system can discern between each request and use the corresponding access token. This could be relevant for instances in which one of the users does not have an account with a certain media streaming service. In this case, because the user is not able to access the other user's services, this user may be able to enjoy the content added to the playlist by the other users, but will not be allowed to add content from such service provider as they do not own an access token for it. Different other examples of how access to a media service could be shared between multiple users are disclosed in U.S. Pat. No. 9,876,780, filed Jan. 27, 2015, entitled "Sharing Access to a Media Service", incorporated herein by reference in its entirety. Example protocols via which a media application may request and receive certifications for accessing and managing a media playback system are provided in U.S. Pat. No. 10,498,833, filed Jul. 14, 2014, entitled "Managing Application Access of a Media Playback System", which is incorporated by reference herein in its entirety.

At block 208, the computing device 106 can receive a set of data. In some embodiments, the set of data is transmitted by the guest control device, as indicated in block 208A. In some other embodiments, the set of data is transmitted by the host media playback system (e.g., one or more host playback devices and/or host controller). In some other embodiments the set of data can be transmitted by both the guest control device and the host media playback system (for example one or more messages with a portion of the set of data could be received from the guest control device and one or more messages with another portion of the set of data can be received from the host media playback system).

In some embodiments, the set of data is transmitted/received during the particular period of time (e.g., while the guest profile is operative and the guest control device is able to communicate with the host media playback system). In other embodiments, the set of data is transmitted/received after the period of time has ended (e.g., when the guest control device is dissociated from the host media playback system). In other embodiments, the set of data is transmitted/received during the period of time and after the period of time has ended (for example one or more messages with a portion of the set of data could be transmitted/received during the period of time and one or more messages with another portion of the set of data can be transmitted/received after the period of time has ended).

The set of data can be data associated with the guest account. For example, any configurations that the guest may have made in block 206A may be sent to the computing device as part of the set of data in block 208A. In this way, the set of data can include any information that the guest explicitly adds to the account such as a guest personal and/or contact information such as name, e-mails address, phone number, a picture, etc. The set of data can include data associated with one or more media streaming service accounts associated with the guest profile (as described with reference to block 206A). For example, the set of data can include login information, such as a set of credentials (or at least part of the set of credentials) for the one or more media streaming service accounts, and/or an access token for the one or more media streaming service accounts, etc. The set of data can include any data related to the interactions of the guest control device with the host media playback system. For example, the set of data can include playback history, such as a history of media items played back by the host media playback system during the particular period of time. The set of data can also include data indicative of the date, location, time of the year (e.g., summer, end of the year holidays, etc.), time of the day (morning, evening, etc.), type of activity (e.g., party, dinner), other users communicating the host media playback system, and the like. The set of data can include any preferences indicated by the guest either explicitly (e.g., marked a song as "liked") or implicitly (repeated a song a certain number of times, skipped a song, etc.). In some embodiments, the set of data can determine a listening profile of the guest, and such information can be used to characterize the guest profile (e.g., recommend content, friends, etc.). In some instances, the set of data can include data related to the media playback system such as a type of device that the guest interacted with. In this way, the guest can remember this information in the future. For example if the guest decides to purchase a media playback system/device based on their guest experience the data can help the guest choose the best device for them. In some embodiments, such data could be used to provide advertisements of the devices to the guest based on their experience.

In some embodiments, data structures are used to transmit/receive and store the set of data. For example, a data structure or file called "musicaccountservices" can be used to store data related to the music service accounts. Example data structures (e.g., settings files) are given in U.S. Pat. No. 10,747,493, filed Jul. 9, 2018, entitled "Distributed Provisioning of Properties of Operational Settings of a Media Playback System", which is incorporated herein by reference in its entirety.

At block 210, the computing device can optionally receive an indication to store the set of data received in block 208. At block 212 the computing device can optionally receive a guest identifier. The indication to store the set of data and the guest identifier can be transmitted by the guest control device, as indicated in blocks 210A and 212A. The indication to store the set of data and the guest identifier can be transmitted/received in one or more messages. For example, a first message or set of messages comprising the indication to store the set of data can be transmitted/received independently of a second message or set of messages comprising the guest identifier.

In some embodiments, any one of (or both) blocks 210 and 212 can occur at any time during the period of time (while the guest account is operative). For example, one of (or both) blocks 210 and 212 can occur when the guest profile is generated in block 206. As another example, one of (or both) blocks 210 and 212 can occur while the guest control device is communicating with the host media system (block 207A) and/or sending the set of data to the computing device (block 208A/208). In those instances, the indication to store the set of data and/or the user identifier can be part of the set of data itself.

In some embodiments, blocks 210 and 212 can occur after the period of time has ended (when the guest control device is dissociated from the host media playback system). For example, when it is detected that the period of time has ended (e.g., that the guest control device left the host WiFi network or is no longer within a range, such as a Bluetooth range, of the Host media playback system), a message could be sent to the guest control device prompting the guest user to decide whether they want to store the set of data associated with the guest account. If the user decides not to store the set of data, the set of data can be permanently deleted from the computing system and any associated storage device. If, however, the user decides to store the set of data, then at block 214 the computing device stores the set of data in association with the guest identifier. In some instances, if no indication to store the set of data was received in block 210, the set of data can be permanently deleted from the host media playback system and/or computing device. In some instances, if no guest identifier is received in block 212, the computing device can store the set of data in association with any data that identifies the guest, for example the system generated temporary identifier, a device identifier, a music service account identifier (for example the computing device may be able to identify a user based on their unique account, profile, log in information, etc. with a music service provider), etc.

The user can be prompted to store the set of data and/or to provide a guest identifier at any time during the process (e.g., during and/or after the period of time). The set of data and user identifier can be stored in a storage device (e.g., a database) accessible to the computing device. In some embodiments, the set of data is stored after the particular period of time has ended so that all the data collected during such period can be stored. In some embodiments, after the period of time has ended, the guest control device can cause the computing device to store the set of data, as indicated by block 214A. Block 214A can involve the guest control device automatically causing the computing device to store the set of data without any specific input so that the computing device automatically stores the set of data after the particular period of time as long as an indication to store the set of data is received in block 210.

In some embodiments, the guest may be prompted to or voluntarily decide to add more data to their profile for storage. For example the guest may decide to store contact information, preferences, personal data, etc. as part of the process of storing the data associated with the guest profile. In some embodiments, the guest account is a temporary account with the media playback system provider, and the user could complete such account and/or convert it into a permanent account with the media playback system provider by providing more data, accepting terms of service and/or privacy statements, verifying an e-mail address and/or phone number, or any other way. The permanent account can be stored as pail of the set of data or be the set of data itself.

As illustrated in FIG. 2, blocks 204-214 of method 200 and blocks 204A-214A of method 200A can occur while the devices (e.g., the guest control device and/or host playback device) are in a host location or environment (e.g., the host house) or right after the guest user leaves the host location (e.g., as the guest control device is disconnected from the host WiFi). As explained before, block 202 of storing a host profile could happen at any moment in time and does not require the guest control device to be present at the host location. In some instances, some of the blocks in method 200/200A can be executed independent of the location and/or proximity between the guest device and the host media playback system. For example, a guest control device could send a request as described in block 204A before arriving at the host location (for example in preparation for event such as a party or dinner a guest could request access to start adding media items for playback at the event). As another example, the set of data, the guest identifier, and the indication to store the set of data could be sent after the guest has left and is in a completely different geographical location. The guest could leave the host house in Boston and travel to San Francisco. After the guest arrives at their destination, they can decide to store the set of data (e.g., they can notice the notification from the system prompting them to store or delete the data). In such case, blocks 208A-214A and 208-214 could be performed outside of the host location. In any case, the set of data and related information could be associated with the interaction that took place at the host location. This interaction can, for example, be while the guest control device was communicating with the host media playback system as described in block 207A. The computing device and/or host media playback system could retain the guest data for a limited period of time (e.g., 1 hour, 8 hours, 24 hours) so that the guest has time to decide whether to store it or not before the data is permanently deleted. In some instances, the set of data can be retained indefinitely until the guest explicitly provides a command/input not to store it. In any case, after blocks 214 and 214A are performed, the guest user has left the host location (or otherwise stopped communicating with the host media playback system) and the method 200 could end.

However, some embodiments relate to instances in which the set of data collected during the guest interaction and stored in block 214 can be further used by the same guest user in the future, regardless of the host media playback system. The guest user could send, from any device, a request for the set of data, using for example the same guest identifier, and the set of data could be sent back to the guest for any purpose. Block 216 could include generating an account (e.g., a Sonos account) using the set of data, registering and/or configuring a service (e.g., a media streaming service), registering and/or configuring a device (e.g., a playback device and/or control device), creating and/or populating a profile in any other application (e.g., social media profile), etc.

In some embodiments and as illustrated in the example of FIG. 2, the set of data can be used to generate a user account associated with the same user as the guest profile and dissociated from the host media playback system. In this regard, method 200 includes a block 216 of generating a user account associated with the guest identifier. This block can include the computing device receiving a request to generate a user account associated with the guest identifier. The request can be received from any device associated with the same user 250 who was the owner of the guest control device 230*a* in the first part of the method, and for whom the guest account was generated in block 206 and the set of data stored in block 214. The computing device can receive, together with the request to generate a user account, the guest identifier (e.g., a user e-mail address used to store the set of data) and therefore infer that it is the same user and use the set of data to create the user account. As illustrated in FIG. 2, block 216 can happen outside of the host location and independent of the host media playback system.

The user account generated in block 216 can be an account associated with a user media playback system comprising one or more playback devices, which is independent and distinct from the host media system. For example, the guest user 250 may have enjoyed their interaction with the host media playback system, and decided to acquire (e.g., purchase) their own media playback system afterwards. In such case, when the user is setting up their own system and creating an account/profile (in a process similar to what was described with reference to block 202), the set of data can be used to pre-populate the account/profile. For example, user personal data, preferences, listening history and music service accounts, or any other data stored as part of the set of data, can be imported to the user account so that the user does not need to provide such information or go through the process of adding the data and accounts. In some embodiments, the set of data associated with the temporary account/guest profile can be stored in block 214 in the form of a proper account/profile (e.g., a Sonos account/profile) so that block 216 can comprise retrieving the account and activating it for the user's own media playback system, rather than generating a new account from the set of data.

In some embodiments, the guest may acquire a media playback system of at least one playback device and register such system with the computing device, in a process such as the one described in U.S. Patent Pub. No. 2022/0104015, which was incorporated by reference above. The computing device can receive a registration message which can be associated with the guest identifier and generate a system identifier which uniquely registers at least one playback device as belonging to the user. The system identifier can then be associated with the user account. This system identifier can be globally unique, and therefore be different from any system identifier associated with the host system.

The computing system could, in response to receiving the registration message, send the set of data to the media playback system and cause the playback device to be configured using the set of data. The media playback system can then be configured to use the set of data to configure at least one characteristic, for example configure one or more media streaming service accounts to be used by the playback device. This process could take place when a user acquires a playback device and registers it, or at a manufacturer/distributor level, such that the device can arrive to the user already preconfigured. Examples of how a playback device can be configured are disclosed in U.S. Pat. No. 9,319,409, filed Feb. 14, 2013, entitled "Automatic Configuration of Household Playback Devices", U.S. Pat. No. 9,237,384, filed Feb. 14, 2013, entitled "Automatic Configuration of Household Playback Devices", and U.S. Pat. No. 10,303,422, filed Jan. 5, 2016, entitled "Multiple-device setup", all of which are incorporated by reference herein in their entirety.

The process described above can provide a streamlined conversion of a guest into a media playback system user leveraging the data from their interactions as guests. As explained the data can be used for onboarding and setup of the user's own media playback system. A similar idea could be used when users are trying a subscription plan (e.g., trial and/or subscription for a system or service). If the customer decides to acquire a system after the trial ends, then all the data collected during the previous temporary interactions could be used to configure and set up the user's own system and account in a simple setup process and/or, even better, to preconfigure the user's system before it is shipped to the user to provide a unique user experience.

In some embodiments, the computing device is configured to access at least one service, such as a media streaming service (e.g., Sonos Radio). The user account generated in block 216 can be an account to access such service. In some embodiments, the user account generated in block 216 can be an additional temporary account for an additional interaction with the same or a different host media playback system, so that the user, as a guest, does not need to configure the profile and can re-use the data already stored with the computing device. In some instances, the set of data associated with the temporary account can be stored in block 214 in the form of a proper account/profile (e.g., a Sonos account/profile) so that such account can be used in future interactions with Hosts media playback systems rather than a new temporary account. In some instances, the guest could then be allowed to interact with the Host media playback system in the future as any other user which is already a user of the media playback system provider (e.g., a Sonos user) using their stored account. The stored account can be set to be operative for a particular period of time for a given interaction with a Host media playback system in the same or similar way as described with reference to the temporary account.

The set of data stored during a previous guest interaction can therefore be used to streamline future guest interactions. For example, the guest may visit the same or a different host and access their media playback system in any of the various ways described in this disclosure. The guest can, for example by providing their guest identifier, retrieve and/or use their stored data/account in this new interaction (e.g., as part of steps 204A/204B). In this way, the guest has prompt access to any data already stored, and could, for example, review and playback media content that they played and/or discover during a previous interaction with the same or a different host.

Future experiences (either as a guest or as a user of their own media playback system) can then be simplified and optimized for the user, streamlining the process of setup of any account or system. For example, the guest could have immediate access to any media streaming service that they have already associated and/or used with their temporary account (e.g., during block 206A), rather than needing to set up or add them to their account. If the music service requires an access token as described before in this disclosure, the token can be stored in association with the set of data so that the user can use their music services to retrieve media content. In some instances, the token may have a validity time. If the token has expired, the computing system and/or user device can simply refresh the token and continue to use the music service. In some instances, this process can happen in the back end so that the user has a seamless access to any music services in their account without major user interaction. As another example, the guest could have access to their listening history and simply select items for addition to the queue rather than search for new content. Any data collected during additional interactions can also be stored in association with the guest account/guest identifier in addition to any data previously stored or as updated data (e.g., updates to the guest account).

Figure 3:
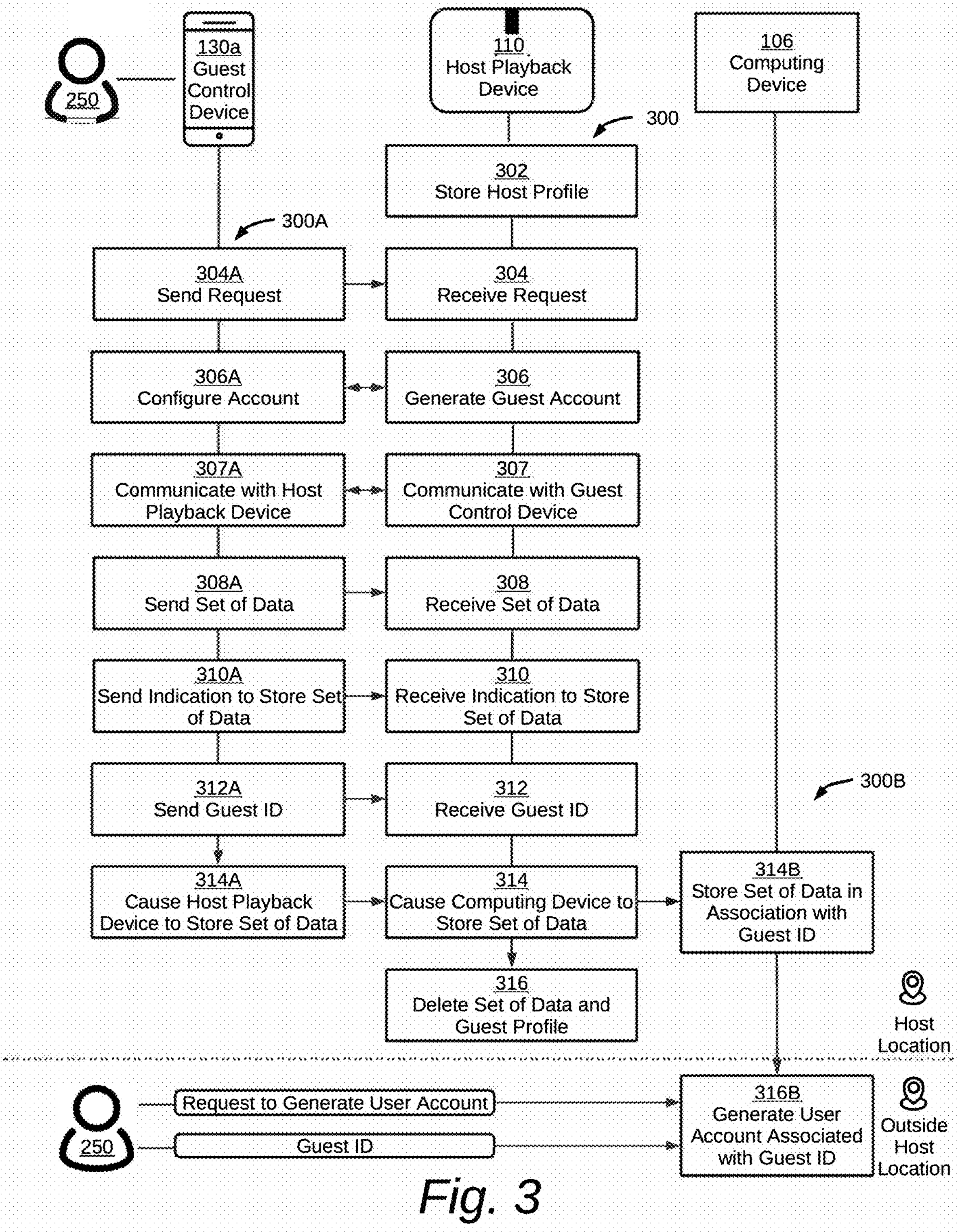
FIG. 3 illustrates a set of flow diagrams of other example methods of operation for a computing device, a control device, and at least one playback device of a media playback system in accordance with embodiments described herein.

FIG. 3 illustrates a set of flow diagrams of other example methods of operation (300, 300A and 300B) for a computing device, such as the computing devices 106 of FIG. 1A, a control device, such as control devices 130 in FIG. 1A, and at least one playback device of a media playback system, such as the playback devices 110 in FIG. 1A. The main difference between the processes shown in FIG. 3 and the ones described with reference to FIG. 2 is that, in the example of FIG. 3, at least one playback device 110 of the host media playback system 100 is involved in some of the blocks.

Method 300 includes a block 302 of the host playback device storing a host account (e.g., data corresponding to the host account). This block can be the same as or similar to block 202 described with reference to FIG. 2, performed by the host playback device. In some instances, the host account can be stored in both the computing device and the playback device (and in all playback devices of the host media playback system).

Method 300 includes a block 304 of the playback device receiving a request to communicate with such playback device or other playback device in the host media playback system. The request could be sent by the guest control device, as indicated by block 304A. Blocks 304 and 304A can be the same as or similar to blocks 204 and 204A described with reference to FIG. 2, with block 304 performed by the host playback device.

Method 300 includes a block 306 of the playback device generating a guest account. On the other hand, method 300A includes a block 306A of configuring such account. Blocks 306 and 306A can be the same as or similar to blocks 206 and 206A described with reference to FIG. 2, with block 306 performed by the host playback device. In some instances, the host playback device can communicate with the computing device to perform such block, for example to obtain a temporary identifier for the guest account.

Method 300 includes a block 307 of communicating with the guest control device. On the other hand, method 300A includes a block 307A of communicating with the host media playback system. Block 307A can be the same as or similar to block 207A described with reference to FIG. 2. Block 307 can include, for example, the host playback device receiving commands from the guest control device and performing certain functions in response, and/or sending messages to the guest control device, such as messages including data to be used to generate/update a user interface by the guest control device (e.g., related to the content being played back).

Method 300 includes blocks 308, 310 and 312, which can, respectively, be the same as or similar to blocks 208, 210, and 212 described with reference to FIG. 2, performed by the host playback device. On the other hand, method 300A continues with blocks 308A, 310A and 312A, which can be, respectively, the same as or similar to blocks 208A, 210A, and 212A described with reference to FIG. 2.

After the particular period of time has ended, and if an indication to store the set of data was transmitted/received in blocks 310A/310, the guest control device can cause the host playback device to store the set of data in block 314A. In this example, the host playback device can, in response to the indication to store the set of data, cause the computing device to store the set of data in block 314. Subsequently, the host playback device can delete the set of data, guest identifier, guest profile and any data related to the guest control device from the host playback device, as indicated in block 316. The computing device can store the set of data in block 314B of method 300B, which can be the same or similar to block 214 of method 200 described with reference to FIG. 2. If, however, the guest decides not to store the set of data (e.g., no indication to store the set of data was received in block 310), block 314 can be omitted and the method can proceed directly to block 316 of deleting the set of data so that in no instance is the data related to the guest account permanently stored in the host media playback system after the guest leaves and/or without the guest consent.

At this point (e.g., after the guest leaves, when the period of time ends), and as with block 216 in FIG. 2, the guest account's access to the host media playback system can be terminated/suppressed. For example, the guest access can be permanently suppressed so that the guest can no longer access the host media playback system unless they are re-invited by the host (as explained with reference to FIG. 4) and/or go again through the process described in FIGS. 2 and 3. In some instances, even if the guest temporary access has ended for a given host media playback system, the guest temporary account can still be valid (e.g., active) in the computing device if the guest decided to store such account and/or data associated with the account. In this way, such data and/or account can be used (e.g., associated with, granted access to) other media playback systems. In this way, the access to a particular host media playback system can be temporary, but the guest account (or set of data associated with it) stored by the computing system can be a permanent account or set of data that persists regardless of any media playback system it can be associated with.

Method 300B includes a block 316B of receiving a request associated with the guest identifier and fulfilling the request, for example generating a user account associated with the guest identifier. Block 316B can be the same as or similar to block 216 of method 200 described with reference to FIG. 2. As described for block 216, this could occur at any moment in time and outside a host location, independent of the host media playback system.

While the examples in FIG. 2 and FIG. 3 are different in that the guest control device communicates with either the computing device (FIG. 2) and/or the host playback device (FIG. 3) for the purposes of being granted access to the host media playback system, it should be noted that a mixed approach is also possible in which part of the blocks are performed at a host media playback system level and others are performed at a computing device level. Additionally, blocks can be performed in combination by the host media playback system and the computing device (for example generating a guest account can be performed by the playback device while obtaining data from the computing device). Furthermore, it should be noted that regardless of how the temporary account is created, the guest control device can safely access the host media playback system without any security or privacy concerns because the guest account is isolated from the host account and will be deleted from the host media playback system when the profile is deactivated. In any case, data will be stored, if the guest desires to do so, in a computing device independent of the host media playback system.

In some embodiments, the host may be allowed to explicitly invite guests before they can initiate the processes described before with reference to FIGS. 2 and 3. In some embodiments, all guests may be blocked or otherwise prevented from accessing the host media playback system by default unless they have been invited by the host. In some embodiments, the invite from the host comprises a token (such as a security token and/or access token) to communicate with the system. The token can be embedded in the invite and shared with the guest at the host discretion. Example techniques for sharing access in these embodiments will be described below with reference to FIG. 4.

Figure 4:
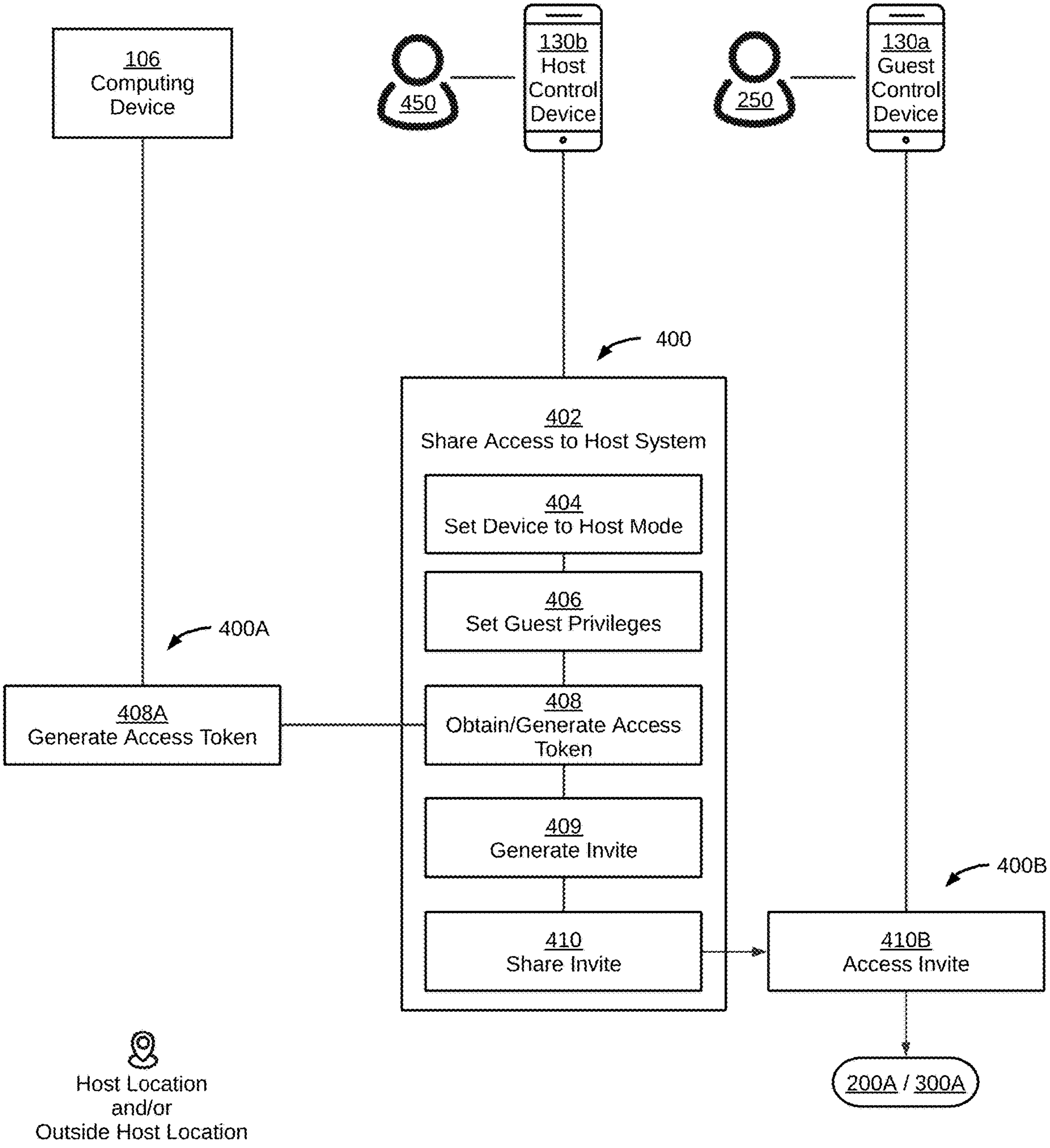
FIG. 4 illustrates a set of flow diagrams of other example methods of operation for a computing device, a control device, and at least one another control device in accordance with embodiments described herein.

FIG. 4 illustrates a set of flow diagrams of other example methods of operation for a computing device, such as the computing devices 106 of FIG. 1A, a control device, such as the control device 130*a* in FIG. 1A, and at least one another control device, such as the control device 130*b* in FIG. 1A. Method 400 is a method for sharing access to a host media playback system with a guest control device. Methods for implementing guest access to a host media playback system are also disclosed in U.S. Pat. No. 11,184,666, which was incorporated by reference above, U.S. Pat. No. 9,977,561, filed Apr. 26, 2013, entitled "Systems, Methods, Apparatus, and Articles of Manufacture to Provide Guest Access", U.S. Pat. No. 9,460,631, filed Nov. 2, 2011, entitled "Systems, Methods, Apparatus, and Articles of Manufacture for Playback Demonstration at a Point of Sale Display", U.S. Pat. No. 10,698,650, filed Apr. 6, 2018, entitled "Temporary Configuration of a Media Playback System within a Place of Accommodation", U.S. Pat. No. 10,042,602, filed Sep. 30, 2015, entitled "Activity Reset", all of which are incorporated by reference herein in their entirety.

Method 400 includes block 402 of sharing access to the host media playback system, which can include various additional blocks 404-410 as illustrated. The method includes block 404 of setting or transitioning the host control device to host mode. This block is optional and can include receiving an input, via a user interface, on an "invite" or "add friends/guests" button. The input can cause the host control device to transition to host mode, for example, by modifying the user interface and/or displaying a second user interface with options to add/invite guests. In some instances, the host mode provides the control device with dedicated functionalities (e.g., different controls) to manage guests interactions. Alternatively, the host may be able to invite guests without entering any specific host mode. For example, from the host control device user interface, the host may be provided with options to invite guests (e.g., to display a QR code that embeds an access token) while the control device stays in its otherwise standard mode of operation.

Method 400 includes a block 406 of setting privileges for the guests. As described before in this disclosure, guests can have access to a limited number of functionalities of the host media playback system. Using the host control device, the host can set those functionalities and/or privileges before sharing access with the guest, so that once access is shared, it is bounded by the privileges set by the host.

Method 400 includes a block 408 of generating or obtaining an access token. The access token can be an access token for the guest control device to access the host media playback system. The access token can be generated by the host control or playback device itself and/or in association with a computing device. For example, the access token can be generated by a computing device, as indicated by block 408A, and sent to/received by the host control device in block 408. Examples of generation and use of access tokens (for guest access or other purposes) are provided in U.S. Pat. No. 11,184,666, which was incorporated by reference above.

As described before in this disclosure, the host can be associated with a host token (also referred to as a "root token") which gives the host access to the host media playback system. The host token can be linked to the system identifier and be unique to such system. The host token can be shared among the family of users/devices that are associated with the host account so that those users/devices have access to the system and are authorized to control functionalities of such system.

In some embodiments, the guest access token generated in block 408 can be generated based on the host token. For example, the host token can be associated with a certain (e.g., maximum) level of privileges that permits the host to fully control the system. The host can then modify the privileges in block 406 so that the token generated in block 408 is a modified version of the host token which grants limited control over the host media playback system.

As described before in this disclosure, privileges can be stored by the host media playback system and/or computing device. For example, if the host sets a level of privileges as described in block 406, such privileges can be replicated among all the devices in the media playback system so that all devices are aware of what functionalities certain guests are allowed/not allowed to control. When a guest token is generated in association with a certain level or set of privileges, such token and respective association can also be replicated among the devices in the media playback system. One form that this association may take is storage in a file or other data structure indicating particular or sets of functionalities that are enabled for the guest token. Any device in the system can reference the association to identify functionalities enabled for the guest. When a guest control device communicates with the media playback system, the guest token can be associated (e.g., included) with the command or message. In this way, the device receiving the message can be able to determine if the guest control device issuing the command is allowed to control the desired functionality by examining the privileges associated with the received guest token and determining whether access to the desired functionality has been granted.

Method 400 includes a block 409 of generating an invite. The invite can be in the form of a link, a QR code or any other form. The invite can embed the token generated in block 408 and the privileges set in block 406, so that when the invite is shared, it allows guest access to the host media playback system using the token and limits the guest actions based on the privileges. An access token could also be provided (e.g., generated) for the guest when the temporary guest account is generated (e.g., blocks 206/306). For example, in instances that do not require an explicit invitation from the host, the access token can be shared during the message exchange described with reference to FIGS. 2 and 3. Such access token can be provided by the computing device, any device in the host media playback system, or the host controller, and replicated to other devices.

The invite can be a general invite (e.g., unique link, unique QR code) that the host can share with multiple guests or can be an individualized invite that the host generates on a per-guest basis that is unique to the particular guest. For example, the invite could be a standard invite with a standard level of privileges that the host can use by default or can be a dynamic invite generated on demand as the host sets the levels of privileges for the guest.

Method 400 includes a block 410 of sharing the invite with the guests. The invite can be shared in various ways such as by providing a QR code for the guest device to scan, or sharing a link with the guest device via any means known in the art such as text messages or any messaging application, e-mail, etc. The QR code can be displayed on a screen or otherwise placed in a visible area of the host location. As another example, the invite can be shared using any other transmission technology such as ultrasound codes, Bluetooth, BLE, or NFC, etc. In some embodiments, the invite could be shared as part of a broadcast signal from the host control device and/or the host media playback system so that any guest in a given proximity (and/or in a host network) receives the invite.

In some embodiments, the invite could be shared via a voice command. For example, the host could issue a voice command that causes the host media playback system to broadcast the invite. As another example, the host could issue a voice command identifying a guest (for example using a guest control device identifier such as a Bluetooth/ device name, a user name, etc.) and cause the host control device and/or host media playback system to send the invite to such guest, for example, using any suitable communication technology such as ultrasound codes, Bluetooth, BLE, or NFC, etc. In some instances, the host could provide the guest with a code or password that the guest can enter when the invite is received, so that even if a user receives an invite (e.g., that was broadcast by the host), they cannot access it unless they have the password to do so.

The guest control device can access the invite in block 410B. Accessing the invite can include the guest control device scanning the QR code, accessing the link, or otherwise receiving and activating (e.g., opening) the invite. When the guest control device accesses the invite, it can be prompted with a web portal or software application through which blocks 204A/304A and other blocks in methods 200A and 300A can be performed.

In some embodiments, the different blocks in method 400 can occur from any location (e.g., a remote location, host location, outside host location) and/or at different moments in time. For example, a host could generate an invite for an event ahead of time (e.g., set privileges, get token, etc.). The host could share the invite with the event guest (or guests) at the time the invite is generated or later. The guest, in turn, can access the invite at the time the invite is received or later. In any case, the guest may be able to interact with the system for the period of time set by the host and limited to the privileges embedded with the invite. In some embodiments, the guest may be allowed to perform certain functions before the period of time, such as adding media items to a playlist for playback at the time of the event. In this way, multiple guests could contribute and, for example, create a playlist for the event ahead of time. Example of shared actions that can be performed remotely and/or ahead of time are disclosed in U.S. Pat. No. 9,674,587, filed Jun. 26, 2012, entitled "Systems and Methods for Networked Music Playback Including Remote Add to Queue", U.S. Pat. Pub. No. 2015/0220498, filed Feb. 5, 2014, entitled "Remote Creation of a Playback Queue for a Future Event", and U.S. Pat. No. 9,705,950, filed Apr. 3, 2014, entitled "Methods and Systems for Transmitting Playlists", all of which are incorporated by reference herein in their entirety.

In some embodiments, some of the blocks described in method 400 could be performed simultaneously, sequentially, or concurrently for multiple guests. For example, the host could generate a unique invite (set privileges, get token, etc.) and share such invite with more than one guest, all of which will be limited to the same set of privileges, period of time, or any other configuration set by the host when generating the invite. For example, the host could perform block 406 and define a set of privileges. Then, the host could perform blocks 408 and 409 and generate a unique invite for that set of privileges. This invite could be used multiple times for multiple guests that will all be limited by the set of privileges. The invite could be also stored, for example by the host control device, the host media playback system, the computing device, or any other storage accessible to the host, so that when the host invites a guest the host does not need to set the privileges and/or generate an invite but only access the invite that has been previously generated. In some embodiments, the host could set a validity time for such invite and/or set of privileges so that it can be used until the validity time has expired.

In some embodiments, the host may be allowed to generate multiple invites associated with different sets of privileges. The host may be allowed to store those invites and use them at their discretion. In this way, the host may be allowed to generate two or more invites associated with different sets of privileges and store them for future use. The invites could be stored with a relevant identifier so that the host can promptly identify which invite to share when needed. For example, the host can define a set of privileges for a "Family" invite, which can be different (e.g., more extensive) than a set of privileges for a "Friends" invite or "Kids' Friends" invite. The host then may be able to search (for example among a list of pre-generated invites) and select the one more appropriate for a current interaction. In this way, guests can be grouped based on privileges at the host's discretion.

The host may also be able to set levels of privileges for the different users in the host household/location. For example, parents may be able to set a level of privileges for kids that prevents them from performing certain actions in a similar way as hosts set the level of privileges for their guests. For example, parents can modify their root token and generate a new token for their kids that grants them access to a limited set of functionalities. In a manner similar to what was described for guest access tokens, the kid's token, once generated, can be stored in the different devices of the media playback system in association with the set of privileges granted to the kids, so that when a given device receives a command associated with the kid's token, the device can verify if the kid is allowed to control the desired functionality by checking the set of privileges associated with the received token. Similarly, a business owner can set a level of privileges for the employees that allows them to control the system based on the owner's pre-set configurations.

In some embodiments, the invite (and/or the token shared with the invite) can be timestamped and have a validity time, for example a Time-To-Live (TTL). For example, the host can generate an invite and set a TTL (e.g., 4 hours). The TTL could define the particular period of time for which the temporary guest account will be operative to access the host media system. After such time the account can be deactivated and/or deleted. The TTL could alternatively or in combination define the time that the invite is valid for sharing (e.g., at a host control device). In those cases, after the TTL has expired the invite is no longer valid or can be refreshed (for example new token generated and/or TTL extended).

In some embodiments, different invites can be generated by cloning setting from a previous invite. The settings can be alternatively modified (e.g., to generate an invite with a different set of privileges). For example, in instances where the access tokens expire after a certain time period, new invites can be generated cloning the settings of the previous invite and embedding the new token (for example if the host desires to keep sharing access of the host media playback system). As another example, the settings from an invite (e.g., "Family" invite) can be cloned for another (e.g., a "Friends" invite) and at least one privilege modified. For example, family may be allowed to start playback in a playback device in a bedroom while friends can only start playback in the living room.

In some embodiments, the invite generated in method 400 can be an extensible invite which can give the guests the option to extend the invite to other guests. For example, the host may have the option to generate an extensible invite when defining the guest privileges in block 406. For example, one of the options in the list of privileges could be allowing the guest to invite other users (e.g., friends, family members, etc.). In some embodiments, the extended invites can be all limited by the original invite shared by the host, so that the guests are prevented from modifying the set of privileges that the host initially selected for the first invite. In some embodiments, the extended invites can have a further limited set of privileges, so that guests can generate invites with a modified set of privileges, as long as the modified set of privileges reduces the additional guest options with reference to or is a subset of the original set of privileges set by the host for the original invite.

In some embodiments, the extended invites replicate the access token initially shared by the host. For example, the guest control device may not be allowed to generate/obtain a new access token to be added to an extended invite, and therefore may be required to re-use the token shared by the host for their invite. In other embodiments, the guest control device may generate/obtain (e.g., from the computing device and/or the host control device and/or media system) a new token for the extended invite. The new token may be a restricted version of the original token (e.g., associated with a limited set of privileges, or a shorter TTL). In some embodiments, the host may be notified and/or otherwise be able to see what guests are generating extended invites and/or accessing such invites (i.e., host may have full knowledge of who is accessing the system at what time and under which permissions). For example, the host may be notified and/or be able to access information about what tokens are currently actively being used to access the host media playback device. In one instance, when a request (e.g., a command) from a guest is received from a guest control device, the host control device can be notified of the guest device which generated such request, the specific access token used in association with such request, etc. In some instances, if the token being used by a guest is an extended token generated by a first guest from the original token shared by the host, such extended token may include an indication that points back to the original token from which it was generated so that the host knows who is accessing the system and who gave them access.

In some embodiments, levels of privileges can be set for multiple users of the host media playback system (not necessarily guests). System owners in different environments such as households, business, commercial establishments, or other shared environment can benefit of this feature in that privileges could be set for the different users of a same system. For example, parents can set a level of privileges for their kids, or an owner can set a level of privileges for a roommate, employee, or customer, etc. The levels of privileges could be based on a root user (e.g., host) and extend multiple levels. For example, each user could be able to share access with other users with a new or the same level of privileges, but all limited by the initial level of privileges established by the host, in a manner similar as described before for extended invites. For example, parents can grant kids access with a limited set of privileges, such as limiting the kids to extend their access so that kids are prevented from granting access/giving privileges to anyone else. As another example, parents can allow kids privilege to invite other people to use the system, but not to pass any privileges on.

When multiple users of the same system (other than guests) have different levels of privileges, those users can all be associated with the host account so that they are also associated with the host token for access to the system. The control devices for the different users can obtain the access token in a manner similar to what was described for the host/guests tokens. Users associated to the host account can all have a copy of the host token, which would grant them the same level of privileges as the host. In some instances, different tokens can be generated for each of those users when their level of privileges is different than the one granted to the host using the root token.

FIGS. 5A-5D illustrate example user interface screens that can be displayed by a control device throughout different blocks described with reference to FIGS. 2-4 (for example during a guest user interaction with a host media playback system). The user interface screens illustrated in FIGS. 5A-5D can be instances of user interface 133 described with reference to FIG. 1H, are used for illustrative purposes only and should not be considered to limit the scope of the invention. Although the different screens illustrated in the example of FIGS. 5A-5D represent a scenario in which a new user interface is presented, each of those screens could be variations of a same user interface. For example, for devices with a larger display area, many of the features represented in these images could be displayed (e.g., overlaid) as part of a same user interface screen rather than multiple screens.

Figure 5A:
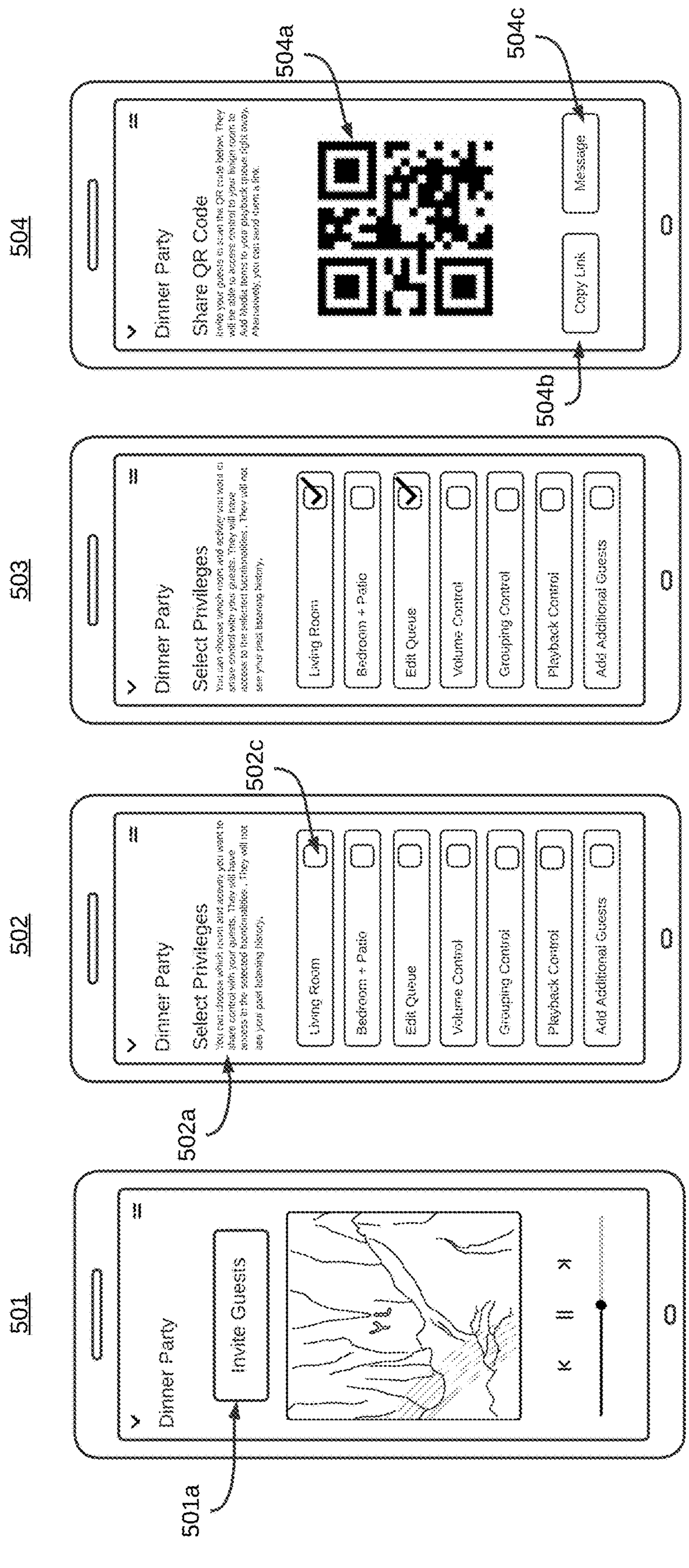
FIG. 5A illustrates a sequence of example user interface screens that may be displayed by a host control device in accordance with embodiments described herein.

FIG. 5A illustrates a sequence of example user interface screens that may be displayed by a host control device. For example, such interfaces could be displayed while the host control device is performing some of the blocks in method 400, described with reference to FIG. 4. Interface 501 can be an instance of user interface 133 which includes an "Invite Guests" selectable region 501*a*. Selectable region 501*a* can be configured so that, when an input is detected on such selectable region, the device is placed in host mode, as described in block 404 of method 400, or otherwise able to share access to the host media payback system with guests.

In the example illustrated in FIG. 5A, selecting selectable region 501*a* causes the control device to display a second interface 502. This example includes displaying the second interface 502, via which the host can control at least one functionality such as invite guests, block guests, grant and remove guest permissions and privileges, start/end a group session, etc. Through this interface, the host could also check the status of the current session such as which guests have access to the host media playback system, what are the permissions and/or privileges for such guests, what functionalities they are controlling, etc. In some instances, accessing this interface is part of setting the device to host mode (as described in an example of block 404 of method 400). The functionalities and controls displayed in this interface can then be related to the host mode. In some instances, the features allowed by interface 501 can be displayed in a region of interface 501 rather than in a new interface.

The second interface 502 can include a guest privileges region 502*a* which can include various selectable icons, such as selectable icon 502*c*, which can be used to define the guests permissions and/or privileges (as in block 406 of method 400). For example, guest privileges portion 502*a* could include a list of playback devices in the host media playback system, so that the host can select, via selectable icons displayed in a portion of the interface relative to the playback devices (such as selectable icon 502*c*) which playback devices the guest will be allowed to communicate with. Similarly, and as illustrated in the specific example of FIG. 5A, guest privileges portion 502*b* can include a list of rooms or groups (e.g., Living room; bedroom+patio; etc.) so that the host can select which rooms the guest can have access to. For example, selectable icon 502C, displayed on a portion of the interface relative to the Living room icon, can be selected to indicate that the guest can be granted access to such room or group of speakers in such room. Interface 503 is an instance of interface 502 in which at least two guest privileges are selected (in this case access to the living room speakers and permission to edit the queue). A similar process can be used to set any kind of privilege such as to limit the functionalities that the guest can control. For example, a list of functionalities such as add/remove media items to/from queue, control volume, control grouping of playback devices, invite other guests, etc. could be provided as part of guest privileges region 502*b* for the host to select which ones the guest will be granted access to. The privileges can be aggregated so that, for example, the guest has permission to add media items for playback by the speakers in the Living room. The list of privileges shown in this example is for explicative purposes only and any combination of privileges could be provided for the host to select. In some instances, the host may select among a more limited (or less granular) set of privileges grouped by functionality, for example edit queue, control volume and/or control grouping. In some instances, the set of privileges can include any functionality such as individually adding items to the queue and/or removing items from the queue so that the host can give the guest a more detailed set of privileges rather than just generally granting them access to the queue.

Once the guest privileges have been established, an invite can be generated, as explained in block 409 of method 400. The invite could include (e.g., associated with, embedded with) an access token for guest access to the host media playback system, and the privileges previously set by the host. In the example of FIG. 5A, the invite is in the form of a QR code 504*a* displayed on an interface 504. The invite can take any form, such as a link, an e-mail, a signal such as an ultrasound or audibly signal transmitted between the devices, etc. The invite interface 504 can include other selectable icons configured to cause the control device to perform certain actions when selected. For example, an input received on icon 504*b* could cause the link to the invite to be copied to clipboard. As another example, an input received on icon 504*c* could cause the control device to send a message, or display a second interface to send a message (such as an interface of a messaging application) with the link to the invite.

Figure 5B:
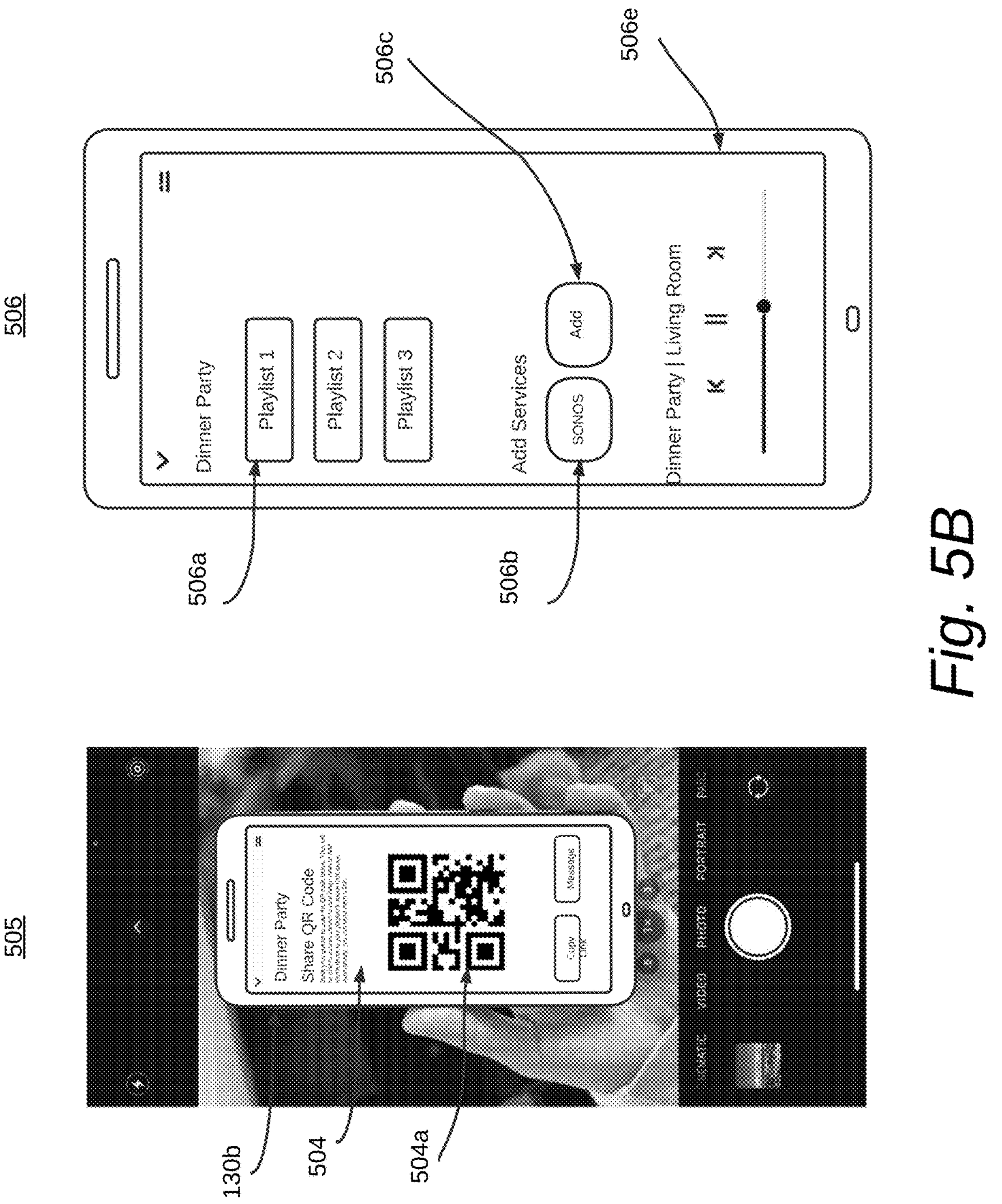
FIGS. 5B-5D illustrate a sequence of example user interface screens that may be displayed by a guest control device in accordance with embodiments described herein.
Figure 5C:
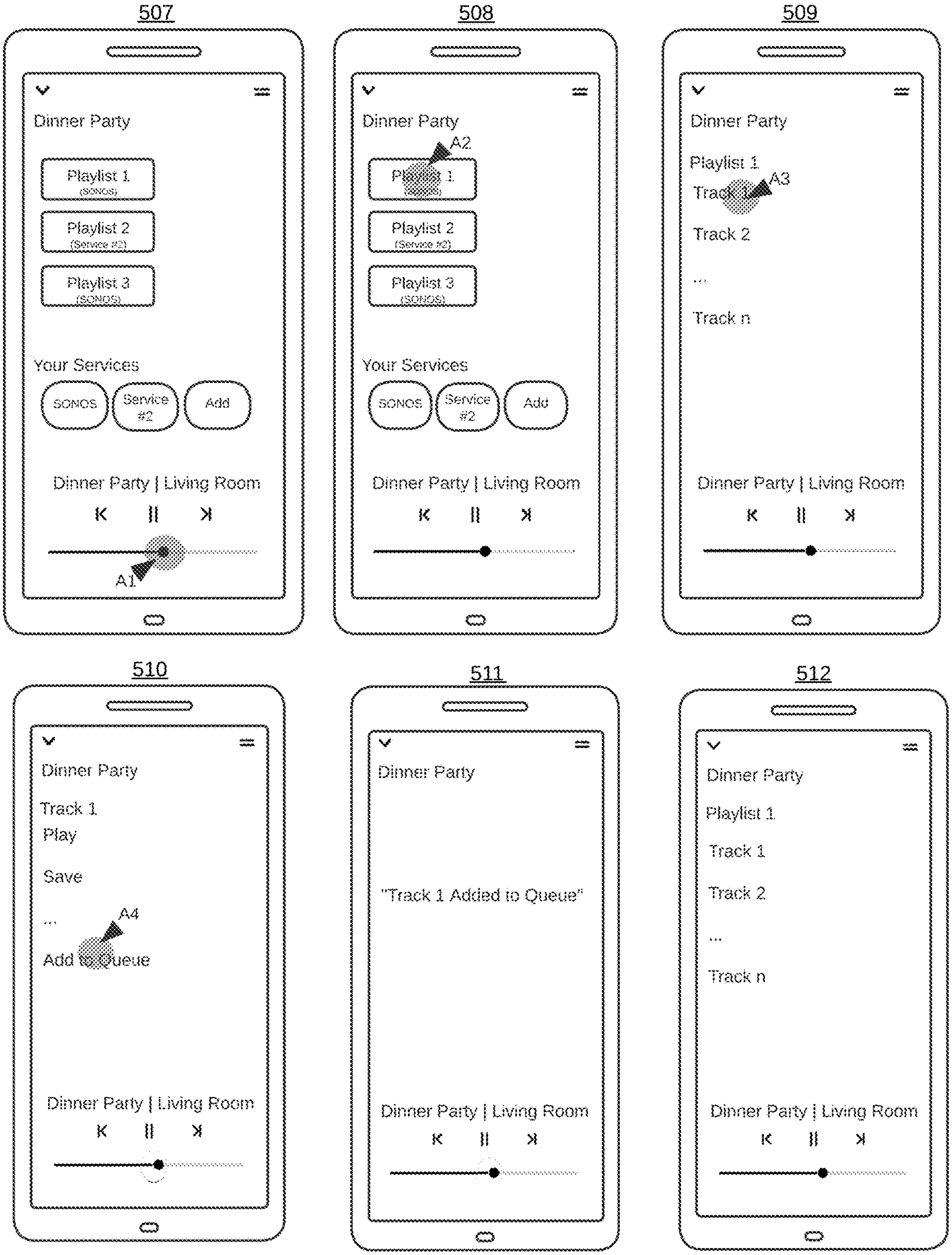

FIGS. 5B and 5C illustrate a sequence of example user interface screens that may be displayed by a guest control device. For example, such interfaces could be displayed while the guest control device is performing some of the actions in blocks 410B in method 400B, described with reference to FIG. 4, and/or some of the blocks in methods 200A and 300A, described with reference to FIGS. 2 and 3, respectively.

Interface 505 in FIG. 5B illustrates an interface of a camera application in the guest control device. In this instance, the guest control device is hovering over the host control device 130*b*. The host control device 130*b* can be displaying the interface 504 comprising the QR code 504*a* as described with reference to FIG. 5A. Interface 505 illustrates one possible implementation of block 410B of method 400B described with reference to FIG. 4 in which the invite is embedded in a QR code and the guest accesses the invite by scanning a QR code. However, other implementations are also possible. For example, the guest may access the invite by selecting a link received from the control device, or opening a notification received in the guest control device.

Once the guest accesses the invite, the guest can be presented a control interface 506 via which the guest can perform some of the blocks in methods 200A and 300A described with reference to FIGS. 2 and 3, respectively. Accessing the invite can include sending the request to interact with the host media playback system explained with reference to blocks 204*a* and 304*a*. The computing device/host media playback system can then execute blocks 204/304 and 206/306 and cause the guest control device to display interface 506.

If the guest control device has a software application installed associated with the media playback system provider (e.g., the Sonos app), control interface 506 can be an interface of the software application. In those cases, accessing the invite can cause the application to be executed on the guest control device. This could be the case if the guest is already a user of the media playback system provider (e.g., a Sonos user) which is attempting to access another media playback system (e.g., a friend's media playback system) as a guest. In such case, the guest could use the token shared by the host to directly communicate with the host media playback system (for example over a host network). Example interactions of guests who are already users of the media playback system provider are provided in U.S. Pat. No. 9,933,920, filed Sep. 27, 2013, entitled "Multi-Household Support", which is incorporated by reference herein in its entirety and U.S. Pat. No. 10,698,650, which was incorporated by reference above.

However, there can be cases in which the guest control device does not include any software application for this specific functionality (e.g., the guest is not yet a Sonos user). In those cases, accessing the invite could cause the guest control device to access a web portal through which a control interface such as control interface 506 can be accessed. This implementation can be advantageous in that a guest is not required to download any application or take any further action in order to start control of the host media playback system. In those embodiments, the guest may use the web controller which in turn could use the token shared by the host to access the host media playback system over the host network. Alternatively, the guest control device could use an Application Programming Interface (API) instead or in addition to the host network. The API could be used via the computing device.

As illustrated in the example of FIG. 5B, the control interface can include various icons and selectable regions. The icons and selectable regions can be used to configure the guest account, as explained with reference to blocks 206A and 306A of FIGS. 2 and 3, respectively. A media content recommendation portion 506*a* can be provided and be populated by data from context (e.g., if the name of the session is Dinner Party, media content recommendation session 506*a* can include recommendations of media content that match the session description and/or name) and/or data from one or more media streaming services added by the guest (e.g., from listening history or preferences of the guest as indicated by the media streaming services added to the guest profile).

A status region 506*e* can also be provided to display playback status information such as content being played back, progress, volume, etc. The status portion 506*e* can include instances of playback status indicator 133*b*, media content information region 133*c*, a playback control region 133*d*, and a zone indicator 133*e* described with reference to FIG. 1H. In fact, control interface 506 can itself be an instance of interface 133 described with reference to FIG. 1H.

A media streaming services region 506*b* can be provided so that the guest can add one or more media streaming services. This can be done as part of blocks 206A/306A of configuring the guest account. As illustrated, one or more icons corresponding to one or more media streaming services can be provided in this portion of the interface. One of the icons (e.g., 506*b*) can be for a media streaming service associated with the provider of the host media playback system (e.g., Sonos Radio). In some embodiments, this media service can be already added to the profile. Options to add one more icons 506*c* can also be provided so that the user can add the media streaming services of their choice. Examples of how to register media services with a control device are disclosed in U.S. Pat. No. 8,910,265, filed Sep. 28, 2012, entitled “Assisted Registration of Audio Sources” which is incorporated by reference herein in its entirety.

Once the guest control device has access to the control interface and has optionally configured the account (e.g., added one or more media streaming service accounts and/or any other data such as data entered by the user, location data, date and time, or any other kind of information), the guest can then communicate with the host media playback system, as described in blocks 207A/307A of methods 200A and 300A, respectively. FIG. 5C illustrates a sequence of example user interface screens that may be displayed by a guest control device when communicating with the host playback system. Interface 507 is an instance of interface 506 in which at least one other media streaming service has been added to the account (Service #2). In this case, the guest has the option to select media content from any of the media streaming services in the account. The guest can control functionalities for the media playback device from this interface, such as for example the volume as indicated by arrow A1, provided that the guest has been granted access to control such functionality.

As illustrated in interface 508, the guest can select an icon corresponding to a playlist provided (e.g., recommended) by any of the media streaming services (e.g., Playlist 1 as indicated by arrow A2). In response to this selection, another interface 509 can be provided with the list of media items included in the selected playlist. Assuming that the guest has permission to do so, the guest can directly select a media item for playback (e.g., Track 1 as indicated by arrow A3) from the list or select an option to add the item to a playback queue, as indicated in interface 510 by arrow A4. Interface 511 can optionally be displayed with status information as to the action performed (e.g., if it was successful or not). Interface 511 could also be used to display a message informing the guest that they do not have permissions to perform the action they attempted to perform (e.g., based on the privileges set by the host). In this case, the guest was able to successfully add the item to the queue, and can continue to communicate with the system to perform other actions. For example, via interface 512, the user could stop playback, control the volume, or select another media item for playback.

Figure 5D:
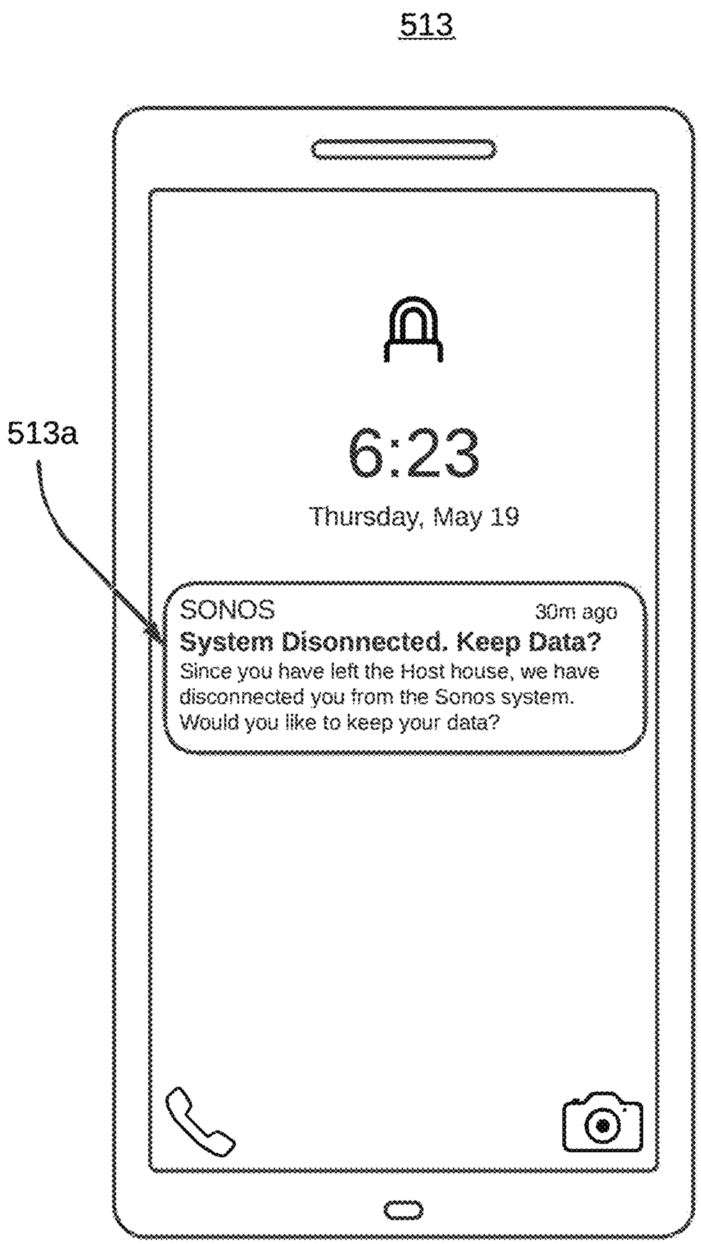

FIG. 5D illustrates an example user interface 513 that can be displayed by the guest control device when the period of time has ended (e.g., when the guest leaves the host network or when a guest time for access has ended). As illustrated, a message 513*a* can be displayed on the interface to indicate that the guest control device is no longer connected or operative to communicate with the host media playback system, and prompting the user to decide whether they wish to store their profile (or set of data associated with the profile). The message can be sent by the computing device, the host media playback system, and/or generated by the guest control device itself once it is detected that the period of time has passed (e.g., that the guest control device has been disconnected from a host network, that a time allowed for the guest to communicate with the system has ended, etc.). In response to this message, the user can decide to store any data associated with the temporary guest account, and blocks 214A, 214 and 216 described with reference to FIG. 2 and/or blocks 314A, 314, 316 and 314C and 316C described with reference to FIG. 3 can be performed.

The data collected during the flow of actions represented by the example user interfaces in FIGS. 5A-5D can then be stored and used by the guest for future interactions, either with the same or another host system, with a guest’s own system, and/or with any service or system associated with the computing device or service provider used to store the set of data.

In some embodiments, data indicative of the content played back during the shared session can be used to generate future content recommendations for any of the host and/or guest. For example, the host may be recommended content based on content added for playback by the guest during the shared session. As another example, any of the host and/or the guest may be reminded of what they were listening to together some time ago. In some embodiments, the data indicative of the content played back during the shared session can be saved in association with the host/guest profiles for future reference. For example, a host may enjoy a particular content played back by the guest and save such content in a personal library. Similarly, the guest may be able to save the playlist or specific content played back during the shared session. Such saved content can be stored as part of the set of data when the shared session is over, and the guest may be able to access it in the future, for example once the guest creates an account with the media playback system provider.

In some embodiments, the media items played back during the shared session are selected from different sources (e.g., different media service accounts). For example, the host may be subscribed to a media streaming service which is different than the media streaming services the guest has access to. In such case, each user could add content for playback from the individual sources during the shared session. In these cases, if one of the users whishes to save content to their personal profile for future reference, a name, artist, album, playlist and/or any descriptive information can be stored that identifies the item and enables the other user to search the item and play it back using their own audio sources, if the item is available. If the item is not available, or in addition to the above, a link to the media item could be stored that could prompt the user to create an account with the media streaming service in which the media item is available.

Embodiments disclosed herein are applicable to any kind of environment where a shared listening experience is desired. For example, embodiments disclosed herein could be used for a vehicle that comprises a media playback system. Multiple users in the vehicle could be able to connect to the media playback system, for example over a local network, and share control of at least one functionality, for example modify a playlist for a road trip.

Other environments may be commercial establishments or businesses such as hotels which can provide the guests with an invite (e.g., QR code) for the guest to create a temporary profile in any of the manners described in this disclosure. When the guest stay is over, the guest could leave the hotel without any concerns that their data will be used by other users. Additionally, the interactions of the guest during their stay could be used in the future, for example to create an account or set a user's playback device up. In some instances the media playback system can be integrated with the commercial establishments (e.g., via APIs between a computing device associated with the media playback system provider and a computing device associated with the commercial establishment) so that the commercial establishments can store guest's data and share it with the media playback system provider and vice versa.

Furthermore, embodiments disclosed herein are applicable to any kind of system and/or service for which a host may grant access to a guest. For example, instead of sharing access to a media playback system, the host may share access to a media streaming service. A temporary account and/or profile could be created to allow the guest to control at least one functionality in the media streaming service (e.g., search and/or select a media item for playback, add the media item to a queue, etc.). Data associated with the guest profile could be stored, upon the guest approval, to be used in the future. For example, the guest may decide to subscribe and/or create an account with the media streaming service provider the guest has previously interacted with through a host account. The guest may provide a guest identifier so that the account can be created using the data previously stored (for example listening history, preferences, personal data, friend's data, etc.). The process of sharing access, creating the temporary account and then creating a permanent account can be the same as or similar to the processes described in this disclosure for access to a media playback system.

In some embodiments, the guest may own at least one playback device compatible with the host media playback system. In those embodiments, the guest may be able to add the guest playback device to the host media playback system. The guest may need permission form the host in order to add their own playback device. Such permission can be given as part of the privileges granted when sharing access. In some embodiments, the guest playback device may be already configured with guest data (for example a guest profile, media content subscriptions, etc.). In those embodiments, the temporary guest profile for accessing the host media playback system could be configured using the guest data in the guest playback device. For example, as part of configuring the profile in blocks 206A and 306A of FIGS. 2 and 3, respectively, the guest could add a playback device to their profile and/or the host media system. At this point, the data in the playback device could be replicated/imported to the guest temporary profile so that the profile is automatically configured. For example, any guest's media streaming service account already configured in the guest playback device could be imported and configured in the guest profile.

In cases in which a speaker is added to the host media playback system (or a guest profile with access to different services), such speaker (or guest profile) may be able to access content which would otherwise not be available to the host media playback system. In those embodiments, the content could be available for playback by the host media playback system as long as the guest playback device (or profile) is active within the host media playback system, so that when the guest leaves, the content is no longer available. Examples of limited-access to media are disclosed in U.S. Pat. No. 10,778,739, filed Sep. 19, 2014, entitled "Limited-Access Media", which is incorporated by reference herein in its entirety.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:

at least one processor; and at least one non-transitory computer-readable medium comprising program instructions that are executable by the at least one processor such that the computing device is configured to:

store data corresponding to a host account, the host account authorized to control a set of functionalities of a host media playback system comprising one or more playback devices;

receive, from a control device, a request to communicate with at least one playback device of the host media playback system;

based on a determination that the control device is not associated with the host account, generate a guest account, wherein the guest account is operative for a particular period of time and, during the particular period of time, both the host account and the guest account share control of at least one functionality in the set of functionalities;

receive, from the control device, in one or more messages:

(i) a set of data associated with the guest account, (ii) an indication to store the set of data, and (iii) a guest identifier;

after the particular period of time and based on the received one or more messages, store, at a media playback system provider server that is remote from the host media playback system, the set of data in association with the guest identifier and cause the host media playback system to permanently remove the set of data from the host media playback system; and based on receiving a request to generate an independent user account associated with the guest identifier for a new user media playback system that is independent from the host media playback system, generate, at the media playback system provider server, the independent user account using the set of data, wherein:

the independent user account is dissociated from the host media playback system, and a system identifier is associated with the independent user account, wherein the system identifier is associated with the new user media playback system.

2. The computing device of claim 1, wherein:

the control device is prevented from communicating with the at least one playback device before the particular period of time starts and after the particular period of time ends.

3. The computing device of claim 1, wherein:

the particular period of time starts when a first condition is met; and the particular period of time ends when a second condition is met.

4. The computing device of claim 3, wherein:

the host media playback system further comprises a host control device; and at least one of the first condition or the second condition is set via the host control device.

5. The computing device of claim 3, wherein:

the first condition includes one or more of:

a) a pre-set start time for the particular period of time; or b) establishment of a token-authorized connection between the host media playback system and the control device; and the second condition includes one or more of:

a) a pre-set end time for the particular period of time; or b) end of the token-authorized connection between the host media playback system and the control device.

6. The computing device of claim 1, wherein:

the independent user account is associated with the new user media playback system comprising one or more user playback devices; and the new user media playback system is independent and distinct from the host media playback system.

7. The computing device of claim 6, wherein the at least one non-transitory computer-readable medium further comprises program instructions such that the computing device is configured to:

receive, from at least one user playback device of the new user media playback system, a registration message, the registration message associated with the guest identifier;

based on receiving the registration message, generate the system identifier, wherein the system identifier uniquely registers the at least one user playback device as belonging to the new user media playback system; and associate the system identifier with the independent user account.

8. The computing device of claim 6, wherein the at least one non-transitory computer-readable medium further comprises program instructions such that the computing device is configured to:

receive, from at least one user playback device of the new user media playback system, a registration message, the registration message associated with the guest identifier; and based on receiving the registration message, send the set of data to the at least one user playback device in the new user media playback system.

9. The computing device of claim 6, wherein:

the new user media playback system is associated with a first globally unique system identifier; and the first globally unique system identifier is assigned to the new user media playback system based on receiving the request to generate the user account associated with the guest identifier.

10. The computing device of claim 9, wherein:
the host media playback system is associated with a second, different globally unique system identifier.

11. The computing device of claim 1, wherein the at least one non-transitory computer-readable medium further comprises program instructions such that the computing device is configured to:
access at least one service; and
wherein the independent user account is an account authorized to access the at least one service.

12. The computing device of claim 11, wherein the at least one service is a media streaming service.

13. The computing device of claim 1, wherein:
the host media playback system is configured to play back media content from a queue of media items; and
the at least one functionality in the set of functionalities comprises adding items to the queue of media items.

14. The computing device of claim 1, wherein:
the guest account is configured to be associated with one or more media streaming service accounts; and
the set of data includes data corresponding to the one or more media streaming service accounts.

15. The computing device of claim 1, wherein the set of data comprises a history of media items played back by the at least one playback device during the particular period of time.

16. A non-transitory computer-readable medium having stored thereon instructions executable by one or more processors to cause a computing device to perform functions comprising:
store data corresponding to a host account, the host account authorized to control a set of functionalities of a host media playback system comprising one or more playback devices;
receive, from a control device, a request to communicate with at least one playback device of the host media playback system;
based on a determination that the control device is not associated with the host account, generate a guest account, wherein the guest account is operative for a particular period of time and, during the particular period of time, both the host account and the guest account share control of at least one functionality in the set of functionalities;
receive, from the control device, in one or more messages:
(i) a set of data associated with the guest account,
(ii) an indication to store the set of data, and
(iii) a guest identifier,
wherein the set of data comprises media playback interaction data generated by the control device during the particular period of time, including at least a history of media items played back by the at least one playback device during the particular period of time;
after the particular period of time and based on the received one or more messages, store, at a media playback system provider server, the set of data in association with the guest identifier and cause the host media playback system to permanently remove the set of data from the host media playback system; and
based on receiving a request to generate an independent user account associated with the guest identifier for a new user media playback system that is independent from the host media playback system, generate, at a media playback system provider server, the independent user account using the set of data, wherein:
the independent user account is dissociated from the host media playback system, and
a system identifier is associated with the independent user account, wherein the system identifier is associated with the new user media playback system.

17. The non-transitory computer-readable medium of claim 16, wherein:
the control device is prevented from communicating with the at least one playback device before the particular period of time starts and after the particular period of time ends.

18. The non-transitory computer-readable medium of claim 16, wherein:
the particular period of time starts when a first condition is met; and
the particular period of time ends when a second condition is met.

19. The non-transitory computer-readable medium of claim 18, wherein:
the host media playback system further comprises a host control device; and
at least one of the first condition or the second condition is set via the host control device.

20. A method to be performed by a computing device, the method comprising:
storing data corresponding to a host account, the host account authorized to control a set of functionalities of a host media playback system comprising one or more playback devices;
receiving, from a control device, a request to communicate with at least one playback device of the host media playback system;
based on a determination that the control device is not associated with the host account, generating a guest account, wherein the guest account is operative for a particular period of time and, during the particular period of time, both the host account and the guest account share control of at least one functionality in the set of functionalities;
receiving, from the control device, in one or more messages:
(i) a set of data associated with the guest account,
(ii) an indication to store the set of data, and
(iii) a guest identifier,
wherein the set of data comprises media playback interaction data generated by the control device during the particular period of time, including at least a history of media items played back by the at least one playback device during the particular period of time;
after the particular period of time and based on the one or more messages, storing, at a media playback system provider server that is remote from the host media playback system, the set of data in association with the guest identifier and cause the host media playback system to permanently remove the set of data from the host media playback system; and
based on receiving a request to generate an independent user account associated with the guest identifier for a new user media playback system that is independent from the host media playback system, generating, at a media playback system provider server, the independent user account using the set of data, wherein:
the independent user account is dissociated from the host media playback system, and a system identifier is associated with the independent user account, wherein the system identifier is associated with the new user media playback system.

* * * * *